US008608542B2

(12) United States Patent
Davis et al.

(10) Patent No.: US 8,608,542 B2
(45) Date of Patent: Dec. 17, 2013

(54) GAMING SYSTEM, GAMING DEVICE AND METHOD PROVIDING COMPETITIVE WAGERING GAMES

(71) Applicant: IGT, Reno, NV (US)

(72) Inventors: Dwayne A. Davis, Reno, NV (US); Palmer A. Dzurella, Lenexa, KS (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/630,501

(22) Filed: Sep. 28, 2012

(65) Prior Publication Data

US 2013/0029752 A1 Jan. 31, 2013

Related U.S. Application Data

(63) Continuation of application No. 12/475,084, filed on May 29, 2009, now Pat. No. 8,292,720.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......... 463/17

(58) Field of Classification Search
USPC .......... 463/17
See application file for complete search history.

(56) References Cited

U.S. PATENT DOCUMENTS

| | | | |
|---|---|---|---|
| 2,743,108 | A | 4/1956 | Sanders |
| 3,853,324 | A | 12/1974 | Reiner et al. |
| 3,877,700 | A | 4/1975 | Moe |
| 3,904,207 | A | 9/1975 | Gold |
| 3,923,305 | A | 12/1975 | Reiner et al. |
| 4,012,046 | A | 3/1977 | Liket |
| 4,129,304 | A | 12/1978 | Mager |
| 4,198,052 | A | 4/1980 | Gauselmann |
| 4,363,485 | A | 12/1982 | Edwall |
| 4,448,419 | A | 5/1984 | Telnaes |

(Continued)

FOREIGN PATENT DOCUMENTS

| | | |
|---|---|---|
| AU | 738686 | 3/1999 |
| EP | 0 375 190 | 6/1990 |

(Continued)

OTHER PUBLICATIONS

Big Times Red, White & Blue Advertisement written by IGT, published before Jan. 2005.

(Continued)

*Primary Examiner* — William M. Brewster
(74) *Attorney, Agent, or Firm* — Neal, Gerber & Eisenberg LLP

(57) ABSTRACT

The gaming system and method disclosed herein provides a player with an opportunity to compete against an opponent (either a virtual opponent or a human opponent). In one embodiment, the gaming system and method provide a competition game that operates concurrently with a wagering game. In one embodiment, the competition game includes a turn-based video game which enables a player to compete against an opponent. Different generated symbol combinations for the wagering game represent different game actions or sequences for the competition game. That is, the symbols or symbol combinations generated in the wager game determine which game actions or sequences the gaming system causes to occur for the competition game. Based on such displayed game actions and sequences, the disclosed gaming system and method determines whether the player or the opponent wins that competition for the competition game.

10 Claims, 18 Drawing Sheets

(56) References Cited

U.S. PATENT DOCUMENTS 4,550,916 A 11/1985 Ortiz
4,582,324 A 4/1986 Koza et al.
4,586,707 A 5/1986 McNeight et al.
4,593,904 A 6/1986 Graves
4,615,527 A 10/1986 Moss
4,618,150 A 10/1986 Kimura
4,624,459 A 11/1986 Kaufman
4,652,998 A 3/1987 Koza et al.
4,666,160 A 5/1987 Hamilton
4,695,053 A 9/1987 Vazquez, Jr. et al.
4,756,532 A 7/1988 Kamille
4,773,647 A 9/1988 Okada et al.
4,775,155 A 10/1988 Lees
4,781,377 A 11/1988 McVean et al.
4,805,907 A 2/1989 Hagiwara
4,856,787 A 8/1989 Itkis
4,926,327 A 5/1990 Sidley
4,936,588 A 6/1990 Rader et al.
4,948,133 A 8/1990 Helm et al.
4,964,642 A 10/1990 Kamille
5,001,632 A 3/1991 Hall-Tipping
5,083,271 A 1/1992 Thacher et al.
5,083,800 A 1/1992 Lockton
5,114,155 A 5/1992 Tillery et al.
5,116,055 A 5/1992 Tracy
5,205,555 A 4/1993 Hamano
5,280,909 A 1/1994 Tracy
5,299,810 A 4/1994 Pierce et al.
5,308,065 A 5/1994 Bridgeman et al.
5,324,041 A 6/1994 Boylan et al.
5,340,317 A 8/1994 Freeman
5,342,047 A 8/1994 Heidel et al.
5,342,049 A 8/1994 Wichinsky et al.
5,342,058 A 8/1994 Giovannetti
5,344,144 A 9/1994 Cannon
5,393,057 A 2/1995 Marnell, II
5,393,061 A 2/1995 Manship et al.
5,393,062 A 2/1995 Cember
5,397,125 A 3/1995 Adams
5,407,200 A 4/1995 Zalabak
5,409,225 A 4/1995 Kelly et al.
5,411,268 A 5/1995 Nelson et al.
5,411,271 A 5/1995 Mirando
5,429,361 A 7/1995 Raven et al.
5,449,173 A 9/1995 Thomas et al.
5,531,440 A 7/1996 Babrowski et al.
5,536,016 A 7/1996 Thompson
5,542,669 A 8/1996 Charron et al.
5,544,892 A 8/1996 Breeding
5,560,603 A 10/1996 Seelig et al.
5,593,349 A 1/1997 Miguel et al.
5,611,535 A 3/1997 Tiberio
5,611,730 A 3/1997 Weiss
5,618,045 A 4/1997 Kagan et al.
5,628,684 A 5/1997 Bouedec
5,639,089 A 6/1997 Matsumoto et al.
5,641,730 A 6/1997 Brown
5,643,088 A 7/1997 Vaughn et al.
5,645,281 A 7/1997 Hesse et al.
5,645,486 A 7/1997 Nagao et al.
5,647,798 A 7/1997 Falciglia
5,664,998 A 9/1997 Seelig et al.
5,667,217 A 9/1997 Kelly et al.
5,676,371 A 10/1997 Kelly et al.
5,697,611 A 12/1997 Kelly et al.
5,700,007 A 12/1997 Kelly et al.
5,700,008 A 12/1997 Lawlor et al.
5,704,612 A 1/1998 Kelly et al.
5,707,285 A 1/1998 Place et al.
5,720,663 A 2/1998 Nakatani et al.
5,722,891 A 3/1998 Inoue
5,733,193 A 3/1998 Allard et al.
5,743,523 A 4/1998 Kelly et al.
5,743,532 A 4/1998 Lafferty
5,752,882 A 5/1998 Acres et al.
5,755,619 A 5/1998 Matsumoto et al.
5,755,621 A 5/1998 Marks et al.
5,766,074 A 6/1998 Cannon et al.
5,769,424 A 6/1998 Kelly et al.
5,769,716 A 6/1998 Saffari et al.
5,772,509 A 6/1998 Weiss
5,779,544 A 7/1998 Seelig et al.
5,779,549 A 7/1998 Walker et al.
5,788,573 A 8/1998 Baerlocher et al.
5,803,451 A 9/1998 Kelly et al.
5,803,914 A 9/1998 Ryals et al.
5,810,354 A 9/1998 Banyai
5,816,918 A 10/1998 Kelly et al.
5,823,873 A 10/1998 Moody
5,823,874 A 10/1998 Adams
5,833,536 A 11/1998 Davids et al.
5,833,537 A 11/1998 Barrie
5,836,586 A 11/1998 Marks et al.
5,836,817 A 11/1998 Acres et al.
5,848,932 A 12/1998 Adams
5,851,148 A 12/1998 Brune et al.
5,855,514 A 1/1999 Kamille
5,860,648 A 1/1999 Petermeier et al.
5,871,398 A 2/1999 Schneier et al.
5,873,781 A 2/1999 Keane
5,882,258 A 3/1999 Kelly et al.
5,882,261 A 3/1999 Adams
5,888,115 A 3/1999 Shoemaker, Jr. et al.
5,890,962 A 4/1999 Takemoto
5,893,718 A 4/1999 O'donnell
5,902,184 A 5/1999 Bennett et al.
5,910,046 A 6/1999 Wada et al.
5,911,418 A 6/1999 Adams
5,919,088 A 7/1999 Weiss
5,927,714 A 7/1999 Kaplan
5,935,002 A 8/1999 Falciglia
5,941,770 A 8/1999 Miers et al.
5,947,820 A 9/1999 Morro et al.
5,951,397 A 9/1999 Dickinson
5,964,463 A 10/1999 Moore, Jr.
5,967,514 A 10/1999 Kelly et al.
5,976,015 A 11/1999 Seelig et al.
5,976,016 A 11/1999 Moody et al.
5,980,384 A 11/1999 Barrie
5,984,781 A 11/1999 Sunaga
5,988,643 A 11/1999 Awada
5,993,315 A 11/1999 Strider et al.
5,997,400 A 12/1999 Seelig et al.
5,997,401 A 12/1999 Crawford
6,004,207 A 12/1999 Wilson, Jr. et al.
6,007,066 A 12/1999 Moody
6,007,426 A 12/1999 Kelly et al.
6,012,722 A 1/2000 Petermeier et al.
6,015,344 A 1/2000 Kelly et al.
6,015,346 A 1/2000 Bennett
6,019,369 A 2/2000 Nakagawa et al.
6,019,374 A 2/2000 Breeding
6,033,307 A 3/2000 Vancura
6,047,963 A 4/2000 Pierce et al.
6,048,271 A 4/2000 Barcelou
6,050,895 A 4/2000 Luciano, Jr. et al.
6,056,642 A 5/2000 Bennett
6,059,289 A 5/2000 Vancura
6,059,658 A 5/2000 Mangano et al.
6,062,981 A 5/2000 Luciano, Jr. et al.
6,071,192 A 6/2000 Weiss
6,089,976 A 7/2000 Schneider et al.
6,089,977 A 7/2000 Bennett
6,089,978 A 7/2000 Adams
6,093,102 A 7/2000 Bennett
6,102,400 A 8/2000 Scott et al.
6,102,402 A 8/2000 Scott et al.
6,102,798 A 8/2000 Bennett
6,110,039 A 8/2000 Oh
6,110,041 A 8/2000 Walker et al.
6,110,043 A 8/2000 Olsen
6,113,098 A 9/2000 Adams
6,117,007 A 9/2000 Matsuyama et al.
6,117,008 A 9/2000 Machiguchi

(56) References Cited

U.S. PATENT DOCUMENTS

| | | | |
|---|---|---|---|
| 6,117,009 | A | 9/2000 | Yoseloff |
| 6,120,031 | A | 9/2000 | Adams |
| 6,120,377 | A | 9/2000 | McGinnis, Sr. et al. |
| 6,126,541 | A | 10/2000 | Fuchs |
| 6,126,542 | A | 10/2000 | Fier |
| 6,126,547 | A | 10/2000 | Ishimoto |
| 6,135,453 | A | 10/2000 | Srichayaporn |
| 6,135,884 | A | 10/2000 | Hedrick et al. |
| 6,135,885 | A | 10/2000 | Lermusiaux |
| 6,139,013 | A | 10/2000 | Pierce et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,146,273 | A | 11/2000 | Olsen |
| 6,149,156 | A | 11/2000 | Feola |
| 6,155,925 | A | 12/2000 | Giobbi et al. |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,164,652 | A | 12/2000 | Lauretta et al. |
| 6,165,070 | A | 12/2000 | Nolte et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,235 | B1 | 1/2001 | Walker et al. |
| 6,174,237 | B1 | 1/2001 | Stephenson |
| 6,179,710 | B1 | 1/2001 | Sawyer et al. |
| 6,186,894 | B1 | 2/2001 | Mayeroff |
| 6,190,255 | B1 | 2/2001 | Thomas et al. |
| 6,193,606 | B1 | 2/2001 | Walker et al. |
| 6,203,429 | B1 | 3/2001 | DeMar et al. |
| 6,206,782 | B1 | 3/2001 | Walker et al. |
| 6,210,279 | B1 | 4/2001 | Dickinson |
| 6,220,593 | B1 | 4/2001 | Pierce et al. |
| 6,220,961 | B1 | 4/2001 | Keane et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,234,900 | B1 | 5/2001 | Cumbers et al. |
| 6,238,288 | B1 | 5/2001 | Walker et al. |
| 6,244,956 | B1 | 6/2001 | Nakayama et al. |
| 6,244,958 | B1 | 6/2001 | Acres |
| 6,251,013 | B1 | 6/2001 | Bennett |
| 6,254,483 | B1 | 7/2001 | Acres |
| 6,257,981 | B1 | 7/2001 | Acres et al. |
| 6,261,177 | B1 | 7/2001 | Bennett |
| 6,267,669 | B1 | 7/2001 | Luciano, Jr. et al. |
| 6,270,409 | B1 | 8/2001 | Shuster |
| 6,270,411 | B1 | 8/2001 | Gura et al. |
| 6,270,412 | B1 | 8/2001 | Crawford et al. |
| 6,279,910 | B1 | 8/2001 | de Keller |
| 6,287,194 | B1 | 9/2001 | Okada et al. |
| 6,290,600 | B1 | 9/2001 | Glasson |
| 6,290,603 | B1 | 9/2001 | Luciano, Jr. |
| 6,293,866 | B1 | 9/2001 | Walker et al. |
| 6,299,165 | B1 | 10/2001 | Nagano |
| 6,302,790 | B1 | 10/2001 | Brossard |
| 6,302,793 | B1 | 10/2001 | Fertitta, III et al. |
| 6,309,298 | B1 | 10/2001 | Gerou |
| 6,309,299 | B1 | 10/2001 | Weiss |
| 6,309,300 | B1 | 10/2001 | Glavich |
| 6,311,976 | B1 | 11/2001 | Yoseloff et al. |
| 6,312,334 | B1 | 11/2001 | Yoseloff |
| 6,315,660 | B1 | 11/2001 | DeMar et al. |
| 6,315,664 | B1 | 11/2001 | Baerlocher et al. |
| 6,319,125 | B1 | 11/2001 | Acres |
| 6,322,309 | B1 | 11/2001 | Thomas et al. |
| 6,328,649 | B1 | 12/2001 | Randall et al. |
| 6,346,043 | B1 | 2/2002 | Colin et al. |
| 6,347,996 | B1 | 2/2002 | Gilmore et al. |
| 6,361,441 | B1 | 3/2002 | Walker et al. |
| 6,364,765 | B1 | 4/2002 | Walker et al. |
| 6,364,766 | B1 | 4/2002 | Anderson et al. |
| 6,364,768 | B1 | 4/2002 | Acres et al. |
| 6,368,216 | B1 | 4/2002 | Hedrick et al. |
| 6,375,187 | B1 | 4/2002 | Baerlocher |
| 6,375,567 | B1 | 4/2002 | Acres |
| 6,379,245 | B2 | 4/2002 | De Keller |
| 6,386,974 | B1 | 5/2002 | Adams |
| 6,393,057 | B1 | 5/2002 | Thoreau et al. |
| 6,394,899 | B1 | 5/2002 | Walker |
| 6,398,218 | B1 | 6/2002 | Vancura |
| 6,398,644 | B1 | 6/2002 | Perrie et al. |
| 6,406,369 | B1 | 6/2002 | Baerlocher et al. |
| 6,413,160 | B1 | 7/2002 | Vancura |
| 6,413,161 | B1 | 7/2002 | Baerlocher et al. |
| 6,425,824 | B1 | 7/2002 | Baerlocher et al. |
| 6,428,412 | B1 | 8/2002 | Anderson et al. |
| 6,431,983 | B2 | 8/2002 | Acres |
| 6,435,511 | B1 | 8/2002 | Vancura et al. |
| 6,443,837 | B1 | 9/2002 | Jaffe et al. |
| 6,454,651 | B1 | 9/2002 | Yoseloff |
| RE37,885 | E | 10/2002 | Acres et al. |
| 6,461,241 | B1 | 10/2002 | Webb et al. |
| 6,464,582 | B1 | 10/2002 | Baerlocher et al. |
| 6,467,771 | B1 | 10/2002 | deKeller |
| 6,481,713 | B2 | 11/2002 | Perrie et al. |
| 6,482,089 | B2 | 11/2002 | DeMar et al. |
| 6,488,580 | B1 | 12/2002 | Robb |
| 6,494,785 | B1 | 12/2002 | Gerrard et al. |
| 6,503,146 | B2 | 1/2003 | Walker et al. |
| 6,506,118 | B1 | 1/2003 | Baerlocher et al. |
| 6,511,375 | B1 | 1/2003 | Kaminkow |
| 6,514,141 | B1 | 2/2003 | Kaminkow et al. |
| 6,522,312 | B2 | 2/2003 | Ohshima et al. |
| 6,533,658 | B1 | 3/2003 | Walker et al. |
| 6,537,150 | B1 | 3/2003 | Luciano et al. |
| 6,547,242 | B1 | 4/2003 | Sugiyama et al. |
| 6,554,704 | B2 | 4/2003 | Nicastro et al. |
| 6,565,434 | B1 | 5/2003 | Acres |
| 6,569,015 | B1 | 5/2003 | Baerlocher et al. |
| 6,572,473 | B1 | 6/2003 | Baerlocher |
| 6,582,306 | B1 | 6/2003 | Kaminkow |
| 6,592,457 | B1 | 7/2003 | Frohm et al. |
| 6,599,185 | B1 | 7/2003 | Kaminkow et al. |
| 6,599,193 | B2 | 7/2003 | Baerlocher et al. |
| 6,602,135 | B1 | 8/2003 | Gerrard |
| 6,602,136 | B1 | 8/2003 | Baerlocher et al. |
| 6,602,137 | B2 | 8/2003 | Kaminkow et al. |
| 6,605,002 | B2 | 8/2003 | Baerlocher |
| 6,607,438 | B2 | 8/2003 | Baerlocher et al. |
| 6,607,441 | B1 | 8/2003 | Acres |
| 6,609,971 | B2 | 8/2003 | Vancura |
| 6,609,974 | B2 | 8/2003 | Mead et al. |
| 6,620,045 | B2 | 9/2003 | Berman et al. |
| 6,632,140 | B2 | 10/2003 | Berman et al. |
| 6,632,141 | B2 | 10/2003 | Webb et al. |
| 6,634,943 | B1 | 10/2003 | Baerlocher |
| 6,638,164 | B2 | 10/2003 | Randall et al. |
| 6,638,167 | B1 | 10/2003 | Sawyer et al. |
| 6,645,073 | B2 | 11/2003 | Lemay et al. |
| 6,645,075 | B1 | 11/2003 | Gatto et al. |
| 6,648,754 | B2 | 11/2003 | Baerlocher et al. |
| 6,652,378 | B2 | 11/2003 | Cannon et al. |
| 6,656,040 | B1 | 12/2003 | Brosnan et al. |
| 6,659,864 | B2 | 12/2003 | McGahn et al. |
| 6,663,489 | B2 | 12/2003 | Baerlocher |
| 6,682,073 | B2 | 1/2004 | Bryant et al. |
| 6,682,419 | B2 | 1/2004 | Webb et al. |
| 6,682,420 | B2 | 1/2004 | Webb et al. |
| 6,685,561 | B2 | 2/2004 | Anderson et al. |
| 6,688,975 | B2 | 2/2004 | Baerlocher et al. |
| 6,692,003 | B2 | 2/2004 | Potter et al. |
| 6,712,699 | B2 | 3/2004 | Walker et al. |
| 6,722,976 | B2 | 4/2004 | Adams |
| 6,722,981 | B2 | 4/2004 | Kaminkow et al. |
| 6,722,982 | B2 | 4/2004 | Kaminkow et al. |
| 6,722,985 | B2 | 4/2004 | Criss-puszkiewicz et al. |

(56) References Cited

U.S. PATENT DOCUMENTS

| | | | |
|---|---|---|---|
| 6,726,563 | B1 | 4/2004 | Baerlocher et al. |
| 6,729,956 | B2 | 5/2004 | Wolf et al. |
| 6,731,313 | B1 | 5/2004 | Kaminkow |
| 6,733,386 | B2 | 5/2004 | Cuddy et al. |
| 6,733,389 | B2 | 5/2004 | Webb et al. |
| 6,739,973 | B1 | 5/2004 | Lucchesi et al. |
| 6,758,747 | B2 | 7/2004 | Baerlocher |
| 6,761,632 | B2 | 7/2004 | Bansemer et al. |
| 6,767,283 | B1 | 7/2004 | Weiss |
| 6,767,284 | B1 | 7/2004 | Koza |
| 6,769,983 | B2 | 8/2004 | Slomiany |
| 6,776,711 | B1 | 8/2004 | Baerlocher |
| 6,780,103 | B2 | 8/2004 | Bansemer et al. |
| 6,780,110 | B2 | 8/2004 | Baerlocher et al. |
| 6,780,111 | B2 | 8/2004 | Cannon et al. |
| 6,783,458 | B2 | 8/2004 | Mead et al. |
| 6,786,820 | B2 | 9/2004 | Gerrard et al. |
| 6,786,824 | B2 | 9/2004 | Cannon |
| 6,793,579 | B2 | 9/2004 | Baerlocher et al. |
| 6,796,899 | B2 | 9/2004 | Baerlocher |
| 6,796,900 | B2 | 9/2004 | Baerlocher et al. |
| 6,796,905 | B2 | 9/2004 | Baerlocher et al. |
| 6,800,026 | B2 | 10/2004 | Cannon |
| 6,800,030 | B2 | 10/2004 | Acres |
| 6,811,482 | B2 | 11/2004 | Letovsky |
| 6,814,664 | B2 | 11/2004 | Baerlocher et al. |
| 6,817,943 | B2 | 11/2004 | Gerrard |
| 6,817,948 | B2 | 11/2004 | Pascal et al. |
| 6,832,957 | B2 | 12/2004 | Falconer |
| 6,832,958 | B2 | 12/2004 | Acres et al. |
| 6,832,959 | B2 | 12/2004 | Baerlocher |
| 6,837,788 | B2 | 1/2005 | Cannon |
| 6,837,793 | B2 | 1/2005 | McClintic |
| 6,852,027 | B2 | 2/2005 | Kaminkow et al. |
| 6,857,958 | B2 | 2/2005 | Osawa |
| 6,863,606 | B1 | 3/2005 | Berg et al. |
| 6,863,607 | B2 | 3/2005 | Gerrard |
| 6,869,361 | B2 | 3/2005 | Sharpless et al. |
| 6,910,964 | B2 | 6/2005 | Acres |
| 6,923,720 | B2 | 8/2005 | Loose |
| 6,939,229 | B2 | 9/2005 | McClintic |
| 6,942,568 | B2 | 9/2005 | Baerlocher |
| RE38,812 | E | 10/2005 | Acres et al. |
| 6,981,917 | B2 | 1/2006 | Webb et al. |
| 7,037,192 | B2 | 5/2006 | Baerlocher et al. |
| 7,094,147 | B2 | 8/2006 | Nakata et al. |
| 7,112,135 | B2 | 9/2006 | Anderson et al. |
| 7,156,735 | B2 | 1/2007 | Brosnan et al. |
| 7,169,046 | B2 | 1/2007 | Webb et al. |
| 7,192,344 | B2 | 3/2007 | Baerlocher |
| 7,192,349 | B2 | 3/2007 | Baerlocher |
| 7,297,058 | B2 | 11/2007 | Gomez et al. |
| 7,314,408 | B2 | 1/2008 | Cannon |
| 7,314,410 | B2 | 1/2008 | Baerlocher et al. |
| 7,326,114 | B2 | 2/2008 | Webb et al. |
| 7,326,115 | B2 | 2/2008 | Baerlocher |
| 7,357,712 | B2 | 4/2008 | Mead et al. |
| 7,357,714 | B2 | 4/2008 | Tessmer et al. |
| 7,364,510 | B2 | 4/2008 | Walker et al. |
| 7,390,263 | B1 | 6/2008 | Acres |
| 7,427,235 | B2 | 9/2008 | Anderson et al. |
| 7,452,270 | B2 | 11/2008 | Walker et al. |
| 7,455,588 | B2 | 11/2008 | Webb et al. |
| 7,470,187 | B2 | 12/2008 | Baerlocher et al. |
| 7,470,188 | B2 | 12/2008 | Baerlocher et al. |
| 7,470,189 | B2 | 12/2008 | Baerlocher et al. |
| 7,470,190 | B2 | 12/2008 | Baerlocher et al. |
| 7,513,828 | B2 | 4/2009 | Nguyen et al. |
| 2002/0045472 | A1 | 4/2002 | Adams |
| 2002/0049084 | A1 | 4/2002 | Hugh-Baird et al. |
| 2002/0059252 | A1 | 5/2002 | Yamaguchi |
| 2002/0077176 | A1 | 6/2002 | Yamaki |
| 2002/0094855 | A1 | 7/2002 | Berman |
| 2002/0107065 | A1 | 8/2002 | Rowe |
| 2002/0128055 | A1 | 9/2002 | Adams |
| 2002/0142822 | A1 | 10/2002 | Baerlocher et al. |
| 2002/0142823 | A1 | 10/2002 | DeMar et al. |
| 2002/0151341 | A1 | 10/2002 | Baerlocher et al. |
| 2002/0151342 | A1 | 10/2002 | Tracy et al. |
| 2002/0151357 | A1 | 10/2002 | Acres |
| 2002/0155873 | A1 | 10/2002 | Berman et al. |
| 2002/0155883 | A1 | 10/2002 | Baerlocher |
| 2002/0160825 | A1 | 10/2002 | Nicastro et al. |
| 2002/0165019 | A1 | 11/2002 | Slomiany |
| 2002/0173355 | A1 | 11/2002 | Walker et al. |
| 2002/0198036 | A1 | 12/2002 | Baerlocher et al. |
| 2002/0198044 | A1 | 12/2002 | Walker et al. |
| 2003/0013519 | A1 | 1/2003 | Bennett |
| 2003/0064772 | A1 | 4/2003 | Tempest et al. |
| 2003/0064773 | A1 | 4/2003 | Baerlocher et al. |
| 2003/0064785 | A1 | 4/2003 | Stone et al. |
| 2003/0069064 | A1 | 4/2003 | Ainsworth |
| 2003/0078089 | A1 | 4/2003 | Gray et al. |
| 2003/0104854 | A1 | 6/2003 | Cannon |
| 2003/0104860 | A1 | 6/2003 | Cannon et al. |
| 2003/0114209 | A1 | 6/2003 | Ritner, Jr. et al. |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119576 | A1 | 6/2003 | McClintic et al. |
| 2003/0119581 | A1 | 6/2003 | Cannon et al. |
| 2003/0125102 | A1 | 7/2003 | Cannon |
| 2003/0125107 | A1 | 7/2003 | Cannon |
| 2003/0148808 | A1 | 8/2003 | Price |
| 2003/0157979 | A1 | 8/2003 | Cannon et al. |
| 2003/0171144 | A1 | 9/2003 | Letovsky |
| 2003/0207709 | A1 | 11/2003 | Paotrakul |
| 2003/0207710 | A1 | 11/2003 | Rodgers et al. |
| 2003/0211880 | A1 | 11/2003 | Locke |
| 2004/0029631 | A1 | 2/2004 | Duhamel |
| 2004/0048659 | A1 | 3/2004 | Seelig et al. |
| 2004/0053673 | A1 | 3/2004 | Mishra |
| 2004/0053683 | A1 | 3/2004 | Hartl et al. |
| 2004/0072619 | A1 | 4/2004 | Brosnan et al. |
| 2004/0106446 | A1 | 6/2004 | Cannon et al. |
| 2004/0116173 | A1 | 6/2004 | Baerlocher |
| 2004/0116174 | A1 | 6/2004 | Baerlocher et al. |
| 2004/0116179 | A1 | 6/2004 | Nicely et al. |
| 2004/0152509 | A1 | 8/2004 | Hornik et al. |
| 2004/0198490 | A1 | 10/2004 | Bansemer et al. |
| 2004/0204226 | A1 | 10/2004 | Foster et al. |
| 2004/0242297 | A1 | 12/2004 | Walker et al. |
| 2004/0242303 | A1 | 12/2004 | Walker et al. |
| 2005/0014554 | A1 | 1/2005 | Walker et al. |
| 2005/0020340 | A1 | 1/2005 | Cannon |
| 2005/0020352 | A1 | 1/2005 | Chilton et al. |
| 2005/0026664 | A1 | 2/2005 | Bansemer et al. |
| 2005/0037838 | A1 | 2/2005 | Dunaevsky et al. |
| 2005/0054411 | A1 | 3/2005 | Hughs-baird et al. |
| 2005/0059462 | A1 | 3/2005 | Gerrard |
| 2005/0101374 | A1 | 5/2005 | Acres |
| 2005/0101379 | A1 | 5/2005 | Falconer |
| 2005/0181853 | A1 | 8/2005 | Baerlocher |
| 2005/0192086 | A1 | 9/2005 | Walker et al. |
| 2006/0040730 | A1 | 2/2006 | Walker et al. |
| 2006/0046836 | A1 | 3/2006 | Walker et al. |
| 2006/0068872 | A1 | 3/2006 | Walker et al. |
| 2006/0121972 | A1 | 6/2006 | Walker et al. |
| 2006/0148549 | A1 | 7/2006 | Walker et al. |
| 2006/0172804 | A1 | 8/2006 | Acres et al. |
| 2006/0183529 | A1 | 8/2006 | Acres et al. |
| 2006/0211472 | A1 | 9/2006 | Walker et al. |
| 2006/0211473 | A1 | 9/2006 | Walker et al. |
| 2006/0211474 | A1 | 9/2006 | Walker et al. |
| 2006/0240890 | A1 | 10/2006 | Walker et al. |
| 2006/0240892 | A1 | 10/2006 | Walker et al. |
| 2006/0247012 | A1 | 11/2006 | Walker et al. |
| 2006/0247013 | A1 | 11/2006 | Walker et al. |
| 2006/0247014 | A1 | 11/2006 | Walker et al. |
| 2006/0252482 | A1 | 11/2006 | Walker et al. |
| 2006/0252492 | A1 | 11/2006 | Anderson et al. |
| 2007/0010321 | A1 | 1/2007 | Walker et al. |
| 2007/0010322 | A1 | 1/2007 | Walker et al. |
| 2007/0015571 | A1 | 1/2007 | Walker et al. |

(56) References Cited

U.S. PATENT DOCUMENTS

| | | | |
|---|---|---|---|
| 2007/0032301 | A1 | 2/2007 | Acres |
| 2007/0087823 | A1 | 4/2007 | Walker et al. |
| 2007/0093288 | A1 | 4/2007 | Walker et al. |
| 2007/0099688 | A1 | 5/2007 | Brosnan et al. |
| 2007/0135214 | A1 | 6/2007 | Walker et al. |
| 2007/0135215 | A1 | 6/2007 | Walker et al. |
| 2007/0167208 | A1 | 7/2007 | Acres |
| 2007/0167230 | A1 | 7/2007 | Baerlocher |
| 2007/0167239 | A1 | 7/2007 | O'rourke |
| 2007/0173310 | A1 | 7/2007 | Walker et al. |
| 2007/0184894 | A1 | 8/2007 | Baerlocher |
| 2007/0191107 | A1 | 8/2007 | Walker et al. |
| 2007/0259713 | A1 | 11/2007 | Fiden et al. |
| 2007/0293293 | A1 | 12/2007 | Baerlocher et al. |
| 2007/0298857 | A1 | 12/2007 | Schlottmann et al. |
| 2007/0298874 | A1 | 12/2007 | Baerlocher et al. |
| 2007/0298875 | A1 | 12/2007 | Baerlocher et al. |
| 2008/0009335 | A1 | 1/2008 | Walker et al. |
| 2008/0020845 | A1 | 1/2008 | Low et al. |
| 2008/0020848 | A1 | 1/2008 | Muir et al. |
| 2008/0032787 | A1 | 2/2008 | Low et al. |
| 2008/0045344 | A1 | 2/2008 | Schlottmann et al. |
| 2008/0064502 | A1 | 3/2008 | Schlottmann et al. |
| 2008/0070680 | A1 | 3/2008 | Baerlocher et al. |
| 2008/0070692 | A1 | 3/2008 | Schlottmann et al. |
| 2008/0070693 | A1 | 3/2008 | Schlottmann et al. |
| 2008/0070694 | A1 | 3/2008 | Schlottmann et al. |
| 2008/0070695 | A1 | 3/2008 | Baerlocher et al. |
| 2008/0076514 | A1 | 3/2008 | Baerlocher et al. |
| 2008/0076515 | A1 | 3/2008 | Baerlocher et al. |
| 2008/0076517 | A1 | 3/2008 | Baerlocher et al. |
| 2008/0076552 | A1 | 3/2008 | Baerlocher et al. |
| 2008/0108404 | A1 | 5/2008 | Iddings et al. |
| 2008/0108436 | A1 | 5/2008 | Oberberger |
| 2008/0119283 | A1 | 5/2008 | Baerlocher |
| 2008/0146322 | A1 | 6/2008 | Hardy et al. |
| 2008/0146323 | A1 | 6/2008 | Hardy et al. |
| 2008/0146325 | A1 | 6/2008 | Walker et al. |
| 2008/0146345 | A1 | 6/2008 | Hardy et al. |
| 2008/0146346 | A1 | 6/2008 | Hardy et al. |
| 2008/0176647 | A1 | 7/2008 | Acres |
| 2008/0268935 | A1 | 10/2008 | Acres |
| 2008/0268953 | A1 | 10/2008 | Acres |
| 2008/0268958 | A1 | 10/2008 | Walker et al. |
| 2008/0318690 | A1 | 12/2008 | Walker et al. |
| 2009/0011826 | A1 | 1/2009 | Acres |
| 2009/0029765 | A1 | 1/2009 | Acres |
| 2009/0054148 | A1 | 2/2009 | Hardy et al. |
| 2009/0061991 | A1 | 3/2009 | Popovich et al. |
| 2009/0061997 | A1 | 3/2009 | Popovich et al. |
| 2009/0061998 | A1 | 3/2009 | Popovich et al. |
| 2009/0061999 | A1 | 3/2009 | Popovich et al. |
| 2009/0075728 | A1 | 3/2009 | Acres |
| 2009/0093299 | A1 | 4/2009 | Acres |
| 2009/0111572 | A1 | 4/2009 | Bigelow, Jr. et al. |
| 2009/0124320 | A1 | 5/2009 | Dewaal |
| 2009/0124354 | A1 | 5/2009 | Acres |
| 2009/0124355 | A1 | 5/2009 | Acres |
| 2009/0124357 | A1 | 5/2009 | Acres |
| 2009/0124358 | A1 | 5/2009 | Acres |
| 2009/0124373 | A1 | 5/2009 | Acres |
| 2009/0131156 | A1 | 5/2009 | Acres |
| 2009/0176548 | A1 | 7/2009 | Nakamura et al. |
| 2009/0191962 | A1 | 7/2009 | Hardy et al. |

FOREIGN PATENT DOCUMENTS

| | | |
|---|---|---|
| EP | 0 449 433 | 10/1991 |
| EP | 0 874 337 | 10/1998 |
| EP | 0 945 837 | 9/1999 |
| EP | 0 984 407 | 3/2000 |
| EP | 0 984 408 | 3/2000 |
| EP | 0 984 409 | 3/2000 |
| EP | 1 624 421 | 2/2007 |
| GB | 1 242 298 | 8/1971 |
| GB | 2 072 395 | 2/1981 |
| GB | 2 066 991 | 7/1981 |
| GB | 2 097 160 | 12/1981 |
| GB | 2 100 905 | 1/1983 |
| GB | 2 117 952 | 10/1983 |
| GB | 2 137 392 | 10/1984 |
| GB | 2 170 636 | 8/1986 |
| GB | 2 180 682 | 4/1987 |
| GB | 2 182 186 | 5/1987 |
| GB | 2 191 030 | 12/1987 |
| GB | 2 207 268 | 1/1989 |
| GB | 2 226 436 | 6/1990 |
| GB | 2 242 300 | 9/1991 |
| GB | 2 258 164 | 2/1993 |
| GB | 2 262 642 | 6/1993 |
| GB | 2 353 128 | 2/2001 |
| GB | 2 387 950 | 10/2003 |
| NZ | 508626 | 11/2001 |
| WO | WO 96/25725 | 8/1996 |
| WO | WO 98/00210 | 1/1998 |
| WO | WO 98/51384 | 11/1998 |
| WO | WO 00/12186 | 3/2000 |
| WO | WO 01/19476 | 3/2001 |
| WO | WO 2004/078297 | 9/2004 |
| WO | WO 2006/004831 | 1/2006 |
| WO | WO 2007/098017 | 8/2007 |
| WO | WO 2007/103054 | 9/2007 |
| WO | WO 2008/063349 | 5/2008 |
| WO | WO 2008/063393 | 5/2008 |

OTHER PUBLICATIONS

Cash Express Advertisements, written by Aristocrat, published in 2002.

Final Fantasy X Review, web page, written by GameSpot, http://www.gamespot.com/ps2/rpg/finalfantasy10/review.html?sid=2832771, available on or before Dec. 14, 2001.

Fortune Cookie Brochure written by IGT, published in 2000.

Full House Brochure written by Anchor Games, published in 2000.

Introducing the Hottest Video Games on the Nile written by Aristocrat Technologies, published Oct. 2000.

Jackpot Bingo advertisement written by CDS.com, printed Apr. 12, 2001.

Jackpot Party brochures and articles published by WMS Gaming Inc. in 1998.

Jewel in the Crown Advertisement written by IGT, published in 1999.

Jewel in the Crown Brochure written by Barcrest, Ltd, published before Sep. 30, 2004.

Joe's Yard Games Video Slots advertisement published by IGT in 2004.

Joes's Yard Games advertisement published by IGT in 2003.

Match Reel Game Bonus Description written by IGT, published before Sep. 30, 2004.

Mikohn Ripley's Believe It or Not article written by Strictly Slots, published in Jun. 2001.

Mountain Coin Machine Distributing—Redemption Games—Cyclone™ from www.mountaincoin.com available on or before Feb. 28, 2002.

Non-Final Office Action dated Apr. 1, 2004 from U.S. Appl. No. 10/429,001, which issued as U.S. Patent No. 6,814,664, pp. 1-4.

Non-Final Office Action dated Mar. 19, 2008 from U.S. Appl. No. 10/982,476, which issued as U.S. Patent No. 7,470,187, pp. 1-10.

Non-Final Office Action dated Jul. 12, 2007 from U.S. Appl. No. 10/982,476, which issued as U.S. Patent No. 7,470,187, pp. 1-5.

Non-Final Office Action dated Mar. 19, 2008 from U.S. Appl. No. 11/830,217, which issued as U.S. Patent No. 7,470,188, pp. 1-11.

Non-Final Office Action dated Mar. 19, 2008 from U.S. Appl. No. 11/830,226, which issued as U.S. Patent No. 7,470,189, pp. 1-9.

Non-Final Office Action dated Mar. 19, 2008 from U.S. Appl. No. 11/830,237, which issued as U.S. Patent No. 7,470,190, pp. 1-11.

Plinko Showcase Show Down article by Strictly Slots, published in Dec. 2001.

(56) References Cited

OTHER PUBLICATIONS

Slot Line Advertisement including Temperature Rising game description written by IGT, published in 1998.

Slots 2003 article written by Melissa Raimondi, published by Strictly Slots in Jan. 2003.

Take Your Pick Brochure written by Anchor Games, published in 1999.

Tickets'n'Tunes from www.rgb.com printed on Feb. 28, 2002.

Top Dollar Brochure written by IGT, published in 1999.

FIG. 8

300

| PLAYER COIN-IN | LIFE UNITS | PLAYER ELIGIBILITY METER | PERCENT OF PLAYER ELIGIBILITY METER PER LIFE UNIT |
|---|---|---|---|
| $10 | 10 | 100% | 10% = 1 LIFE UNIT |
| $50 | 50 | 100% | 2% = 1 LIFE UNIT |
| $100 | 100 | 100% | 1% = 1 LIFE UNIT |
| $500 | 500 | 100% | 0.2% = 1 LIFE UNIT |

FIG. 9

310

| OPPONENT | LIFE UNITS | OPPONENT ELIGIBILITY METER | PERCENT OF PLAYER ELIGIBILITY METER PER LIFE UNIT |
|---|---|---|---|
| BOSS # 1 | 10 | 100% | 10% = 1 LIFE UNIT |
| BOSS # 4 | 40 | 100% | 2.5% = 1 LIFE UNIT |
| BOSS # 5 | 50 | 100% | 2% = 1 LIFE UNIT |
| BOSS # 10 | 100 | 100% | 1% = 1 LIFE UNIT |

FIG. 10A

PLAYER

320

| TYPE | ELIGIBILITY METER CHANGE |
|---|---|
| NEUTRAL EVENT | 0% |
| PLAYER ELIGIBILITY METER DECREASE MODIFIER EVENT (DEFEND EVENT) | 1% TO 100% |
| OPPONENT ELIGIBILITY METER DECREASE EVENT (HIT EVENT) | 1% TO 100% |
| PLAYER ELIGIBILITY METER INCREASE EVENT (HEAL EVENT) | 1% TO 100% |

OPPONENT

330

| TYPE | ELIGIBILITY METER CHANGE |
|---|---|
| NEUTRAL EVENT | 0% |
| PLAYER ELIGIBILITY METER DECREASE EVENT (HIT EVENT) | 1% TO 100% |
| OPPONENT ELIGIBILITY METER INCREASE EVENT (HEAL EVENT) | 1% TO 100% |

GAMING SYSTEM, GAMING DEVICE AND METHOD PROVIDING COMPETITIVE WAGERING GAMES

PRIORITY CLAIM

This application is a continuation of, claims priority to and the benefit of U.S. patent application Ser. No. 12/475,084, filed on May 29, 2009 U.S. Pat. No. 8,292,720 B1, the entire contents of which are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

In such known gaming machines, the amount of the wager made on the base game by the player varies. For instance, the gaming machine enables the player to wager a minimum number of credits, such as one credit (e.g., one cent, nickel, dime, quarter or dollar) up to a maximum number of credits, such as five credits. The player makes this wager a single time or multiple times in a single play of a primary game. For instance, a slot game having one or more paylines enables the player to make a wager on each payline in a single play of the primary game. Slot games with one, three, five, nine, fifteen, and twenty-five lines are widely commercially available. Thus, it is known that a gaming machine, such as a slot game, enables players to make wagers of substantially different amounts on each play of the primary or base game ranging, for example, from one credit up to one-hundred twenty-five credits (e.g., five credits on each of twenty-five separate paylines).

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine triggers the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be).

Known non-wagering video games include a plurality of rounds. That is, for each round in such non-wagering video games, each of a plurality of players takes a turn (i.e., commits a game action). Such non-wagering video games are commonly referred to as turn-based games. One type of turn-based game, such as a waiting turn-based game, alternates individual game actions between the players (e.g., human or virtual) in a sequential, rather than a simultaneous, manner for each round. In such turn-based games, the round ends once each of the players has taken their respective turn. Another type of turn-based game, such as a real-time turn-based game (or an action turn-based game), enables each player to independently make individual game actions for each round and processes the results of each player's actions for that round in real-time. In such real-time turn-based games, the round ends once each of the players has taken their respective turn (which could include one or more player actions based on the speed of those actions). For example, in a real-time turn-based game, a first player makes two individual game actions and a second, faster player makes four individual game actions for their respective turn in the round. In this example, each individual game action is processed and/or displayed in real-time. Other known games, such as comparison games, enable each player to independently make individual game actions for each round and compare the results of each player's action for that round. Based on the results of one or more of the individual rounds, known turn-based games determine which player wins (or which players win) the turn-based game.

There is a continuing need to provide new and different gaming machines and gaming systems as well as new and different ways to enable players to play for and win awards, such as bonus awards. There is also a continuing need to provide new and different linked or related gaming machines.

SUMMARY

In one embodiment, the disclosed gaming system and method provide a competition game that operates concurrently with a wagering game, such as a primary game. In one embodiment, the competition game includes a turn-based video game which enables a player to compete against an opponent. Each play of the wagering game includes a random symbol generation for the player and a random symbol generation for the opponent, wherein a series of such random symbol generations form a round of the competition game. Symbol combinations generated for the player and the opponent in the wagering game represent different game events, actions or sequences for the player and the opponent in the competition game. That is, the symbols or symbol combinations generated in the wagering game determine which game events, actions or sequences the gaming system causes to occur for the competition game. Based on such game events, actions and sequences, the disclosed gaming system and method determines whether the player or the opponent wins the competition game. In one embodiment, the gaming system determines whether to provide the player an award based on the player's wager for the wagering game and the randomly generated symbol combination for the player in the wagering game. That is, the symbol combination randomly generated for the player in the wagering game serves two functions: (i) to determine an action or sequence in the competition game, and (ii) to determine if the player receives an award for the play of the wagering game.

In one embodiment, the competition game includes one or more rounds, wherein each one of the rounds includes a series of competitions between the player and the opponent. For each one of the series of competitions of one round of the competition game, the gaming system randomly generates a symbol combination for the player in the wagering game and randomly generates a symbol combination for the player's opponent in the wagering game. For example, for a slot wagering game, a first plurality of reels displays a randomly generated symbol combination for the player and a second plurality of reels displays a randomly generated symbol combination for the opponent. In one embodiment, each random symbol generation for the player in the wagering game constitutes one turn or one competition game action for the player and each random symbol generation for the player's opponent in the wagering game constitutes one turn or one competition game action for the player's opponent.

After randomly generating separate symbol combinations for the player and the opponent for the wagering game, in one embodiment, the gaming system compares the randomly generated symbol combination for the player to the randomly generated symbol combination for the opponent to determine the result or outcome of the competition game. Based on one or more of such comparisons (i.e., the series of competitions), the gaming system determines a result or outcome of the competition game between the player and the player's opponent. After comparing the randomly generated symbol for the player with the randomly generated symbol for the player's opponent, the gaming system determines whether to increase, decrease or not change: (i) a player eligibility meter, (ii) an opponent eligibility meter, (iii) a credit meter, or (iv) any combination of the player eligibility meter, the opponent eligibility meter, and the credit meter in the competition game. Additionally, the gaming system compares the randomly generated symbol for the player with the randomly generated symbol for the player's opponent to determine the amount to increase or decrease: (i) a player eligibility meter, (ii) an opponent eligibility meter, (iii) a credit meter, or (iv) any combination of the player eligibility meter, the opponent eligibility meter, and the credit meter.

In one embodiment, the player eligibility meter graphically indicates the player's eligibility remaining for the competition game. The gaming system sets the player eligibility meter to an initial value. In different embodiments, the initial value of the player eligibility meter is predetermined or based on the player's amount of coin-in and/or the placed wager amount. For example, if the player inserts a first designated amount of coin-in (or places a first wager), such as $100, the gaming system sets the player eligibility meter to a first value (e.g., 200 life-units). That is, for the first designated amount of coin-in (or wager placed), the gaming system equates the player eligibility meter to the first value (e.g., 200 life-units). In this example, if the player inserts a second designated amount of coin-in (or places a second wager), such as $500, the gaming system sets the player eligibility meter to a second value (e.g., 1000 life units). That is, for the second designated amount of coin-in (or wager placed), the gaming system equates or converts the player eligibility meter to the second value (e.g., 1000 life units). In this embodiment, the gaming system equates or converts the amount of coin-in and/or the amount wagered by the player into an amount of life units that is graphically represented by the player eligibility meter. In one such embodiment, the player eligibility meter graphically represents the amount of life units as a percentage (e.g., 100%).

In one embodiment, the opponent eligibility meter graphically indicates the opponent's eligibility remaining for the competition game. If the opponent is controlled by the gaming system, the gaming system sets the opponent eligibility meter to a predetermined initial value (e.g., a predetermined number of life units). For example, the gaming system sets the opponent eligibility meter for the opponent to a predetermined value (e.g., 50 life units). In one such embodiment, the opponent eligibility meter graphically represents the predetermined number of life units as a percentage (e.g., 100%). If the opponent is another player playing at one of the gaming devices in the gaming system, the gaming device sets the player eligibility meter for that player to an initial value as described above.

In one embodiment, to determine the affect of the randomly generated symbol combinations of the wagering game on the competition game, the gaming system compares the results of the random symbol generations using a lookup table or some other ranking or hierarchy. For example, a first symbol combination generated for the player is associated with an action (e.g., whether the gaming system decreases the opponent's eligibility meter) and an amount of change (e.g., decrease by 15 life units or by 15%). In this example, a second symbol combination generated for the player's opponent is associated with an action (e.g., whether the gaming system decreases the player's eligibility meter) and an amount of change (e.g., decrease by 8 life units or by 8%). The gaming system compares these random generations to determine the effective result of the wagering game on the competition game. For the competition game, based on the above example, the gaming system decreases the opponent's eligibility meter by fifteen life units and the player's eligibility meter by eight life units based on the comparison between the generated symbol combinations for the player and the opponent.

In one embodiment, to determine the affect of the randomly generated symbol combinations of the wagering game on the competition game, the gaming system individually processes the results of the random symbol generations (e.g., using a lookup table). In one such embodiment, the competition game is turn-based such that a first symbol combination is generated for the player and any competition game action resulting from the first symbol combination is displayed for the player before a second symbol combination is generated for the player's opponent and any competition game action resulting from the second symbol combination is displayed for the opponent. For example, a first symbol combination of the wagering game is associated with an action (e.g., whether the gaming system decreases the opponent's eligibility meter) and an amount of change (e.g., decrease by 15 life units or by 15%) for the competition game. In this example, a second symbol combination of the wagering game is associated with an action (e.g., whether the gaming system decreases the player's eligibility meter) and an amount of change (e.g., decrease by 8 life units or by 8%) for the competition game. The gaming system individually processes the results of the wagering game and displays the results of the wagering game on the competition game. For the competition game in the above example, the gaming system decreases the opponent's eligibility meter by fifteen life units based on the generated symbol combination for the player and graphically displays such decrease to the opponent's eligibility meter (e.g., with an animated game event). Subsequently, the gaming system decreases the player's eligibility meter decreases by eight life units based on the generated symbol combinations for the opponent and graphically displays such decrease to the player's eligibility meter (e.g., with an animated game event). If the player's opponent were provided the first turn in the competition game, the gaming system decreases the player's eligibility meter by eight life units and subsequently decreases the opponent's eligibility meter by fifteen life units based on the generated symbol combinations for the opponent and the player.

As mentioned above, in one embodiment, the competition game includes a plurality of rounds. In one such embodiment, each round is associated with one opponent, wherein the player engages in a series of competitions against that opponent for that round (e.g., a series of random symbol generations for the player and a series of random symbol generations for the opponent). In one embodiment, the player competes against an opponent in a first round and the player only advances to a subsequent round if that player wins the competition game against that opponent. In one embodiment, the series of rounds are finite such that the gaming system includes a final round associated with a final opponent. If the player wins the final round, the gaming system causes an award to be provided to the player and the competition game ends. If the competition game ends, the gaming system provides the player an opportunity to play another competition game, such as the same competition game (e.g., against the same opponent or opponents) or a different competition game (e.g., against a different opponent or opponents).

In one embodiment, a player eligibility meter represents the number of chances that the player has to obtain a bonus award triggering event. A player bonus triggering event progress meter tracks and graphically indicates the player's progress toward the bonus award triggering event. In one embodiment, the player's progress toward the bonus award triggering event generally increases as the player's eligibility remaining for the competition game decreases. This relationship between the bonus award triggering event progress meter and the player eligibility meter enables the gaming system to provide a benefit to the player for each turn of the competition game.

In one embodiment, the bonus triggering event provides the player with an additional opportunity to decrease the opponent's eligibility meter without risk of the player's eligibility meter decreasing. In one such embodiment, the gaming system provides the player with one or more enhanced symbol generations for the wagering game. Such enhanced symbol generations improve the player's chance to obtain a beneficial outcome for the competition game. In one embodiment, the gaming system provides the player with at least one enhanced symbol generation through implementation of at least one additional symbol generator, at least one additional symbol and/or at least one additional payline for the wagering game.

Accordingly, the gaming system and method disclosed herein provides the player with an opportunity to participate in a competition game while concurrently playing a wagering game. In the gaming system disclosed herein, symbol combinations randomly generated in the wagering game determines any game events, actions or sequences in the competition game in addition to determining whether the player wins any beneficial outcomes, such as awards, bonus awards, additional themes or scenes for the competition game, additional features for the wagering game and/or the competition game, or additional rounds for the competition game. In one embodiment, the bonus triggering event progress meter disclosed herein enables the gaming system to increase the player's chance of receiving a beneficial outcome for the competition game regardless of whether the random symbol combination resulting from the wagering game positively or negatively changes the player eligibility meter. Additionally, the gaming system and method disclosed herein provides new and different ways to equate video game functions to gaming machines. Additional features and advantages are described herein, and will be apparent from the following Detailed Description and the figures.

BRIEF DESCRIPTION OF THE FIGURES

FIG. 8 is one example of a chart in accordance with one embodiment of the disclosed gaming system which shows a plurality of life unit values associated with the player eligibility meter based on different values of coin-in.

FIG. 9 is one example of a chart in accordance with one embodiment of the disclosed gaming system which shows a plurality of life unit values associated with the opponent eligibility meter for different opponents.

FIGS. 10A and 10B are examples charts in accordance with one embodiment of the disclosed gaming system which show a plurality of competition game events.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
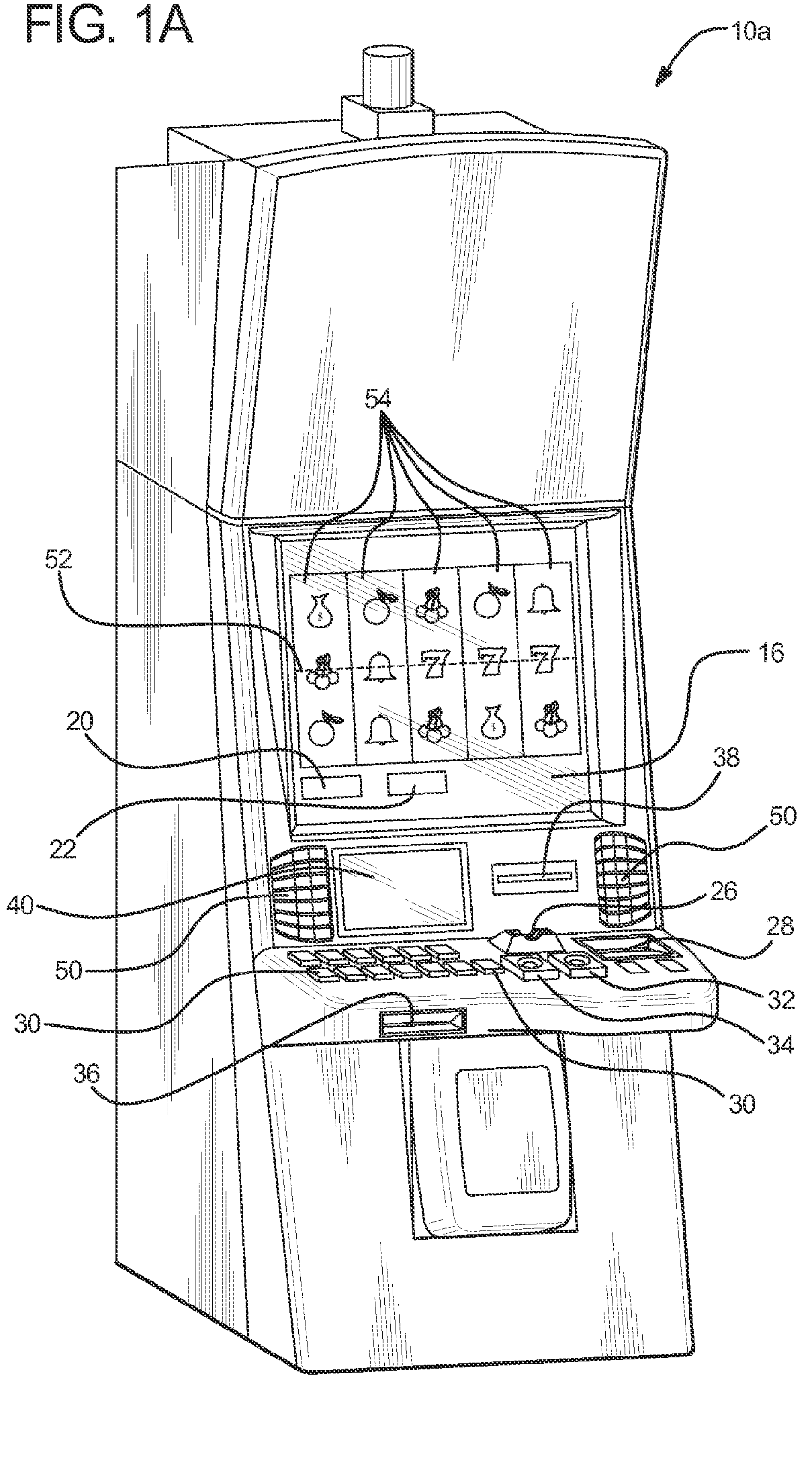
FIGS. 1A and 1B are perspective views of alternative embodiments of one of the gaming devices in the gaming system of the present disclosure.
Figure 1B:
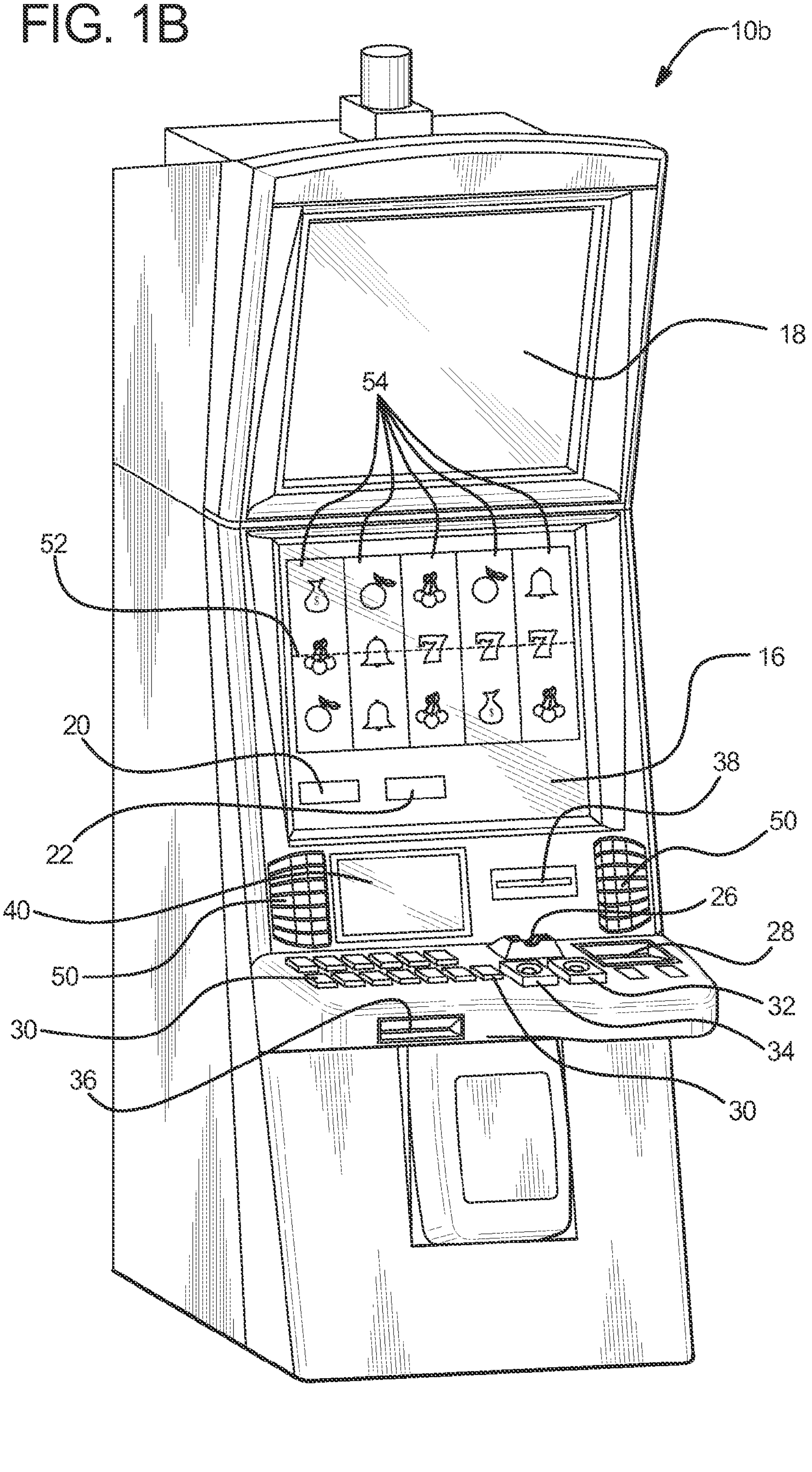

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
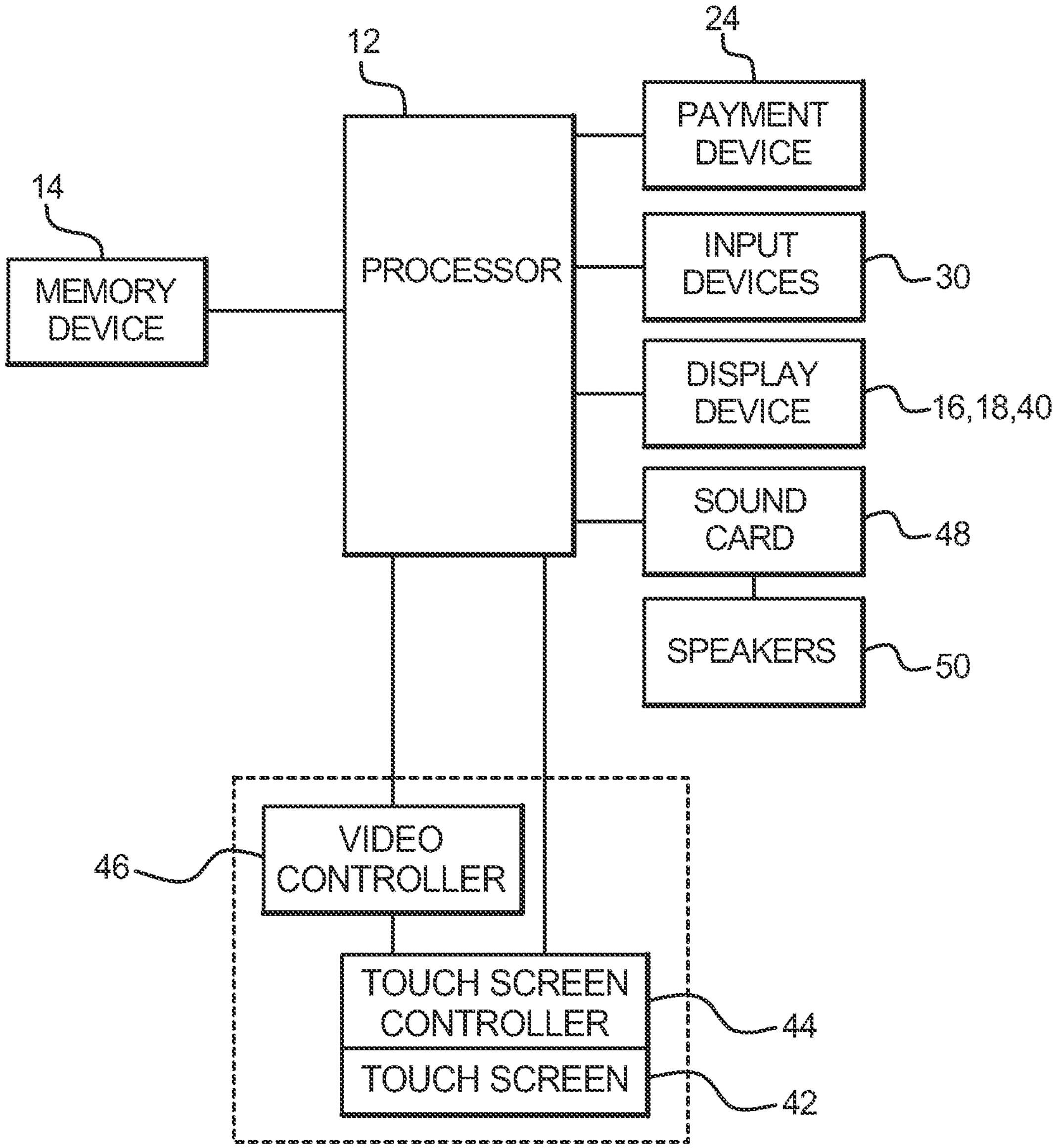
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (FDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG.

1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a FDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like. In one embodiment, the symbols, images and indicia displayed on or of the display device form one or more symbol combinations.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia. In one embodiment, the camera acquires an image of the player and the processor incorporates that image into the competition game as a game image or avatar when the player competes against an opponent.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In one embodiment, the indicia or symbols displayed by a plurality of the reels 54 form a symbol combination. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the players wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand, which is sometimes referred to as a symbol combination. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one but potentially a plurality of the selectable indicia or numbers via an input device such as a touch screen. The gaming device then displays a series of drawn numbers (e.g., which form a symbol combination) and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
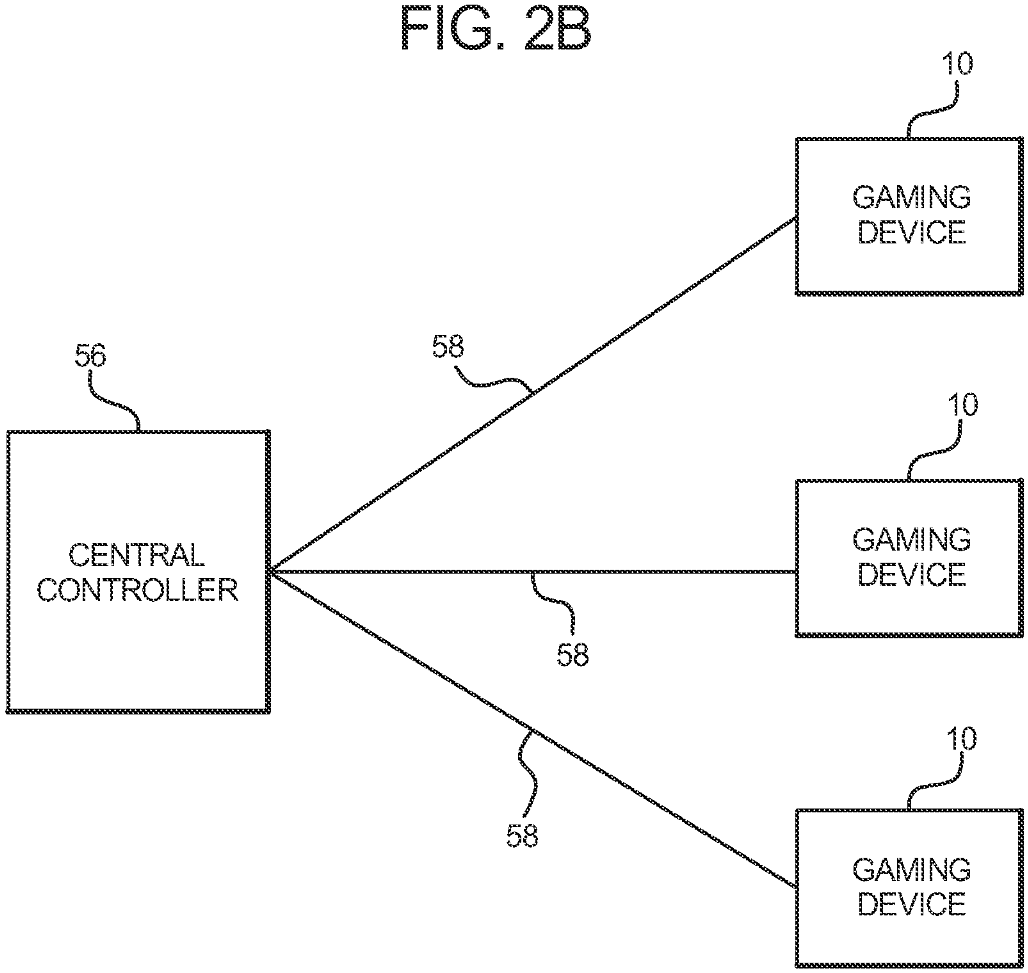
FIG. 2B is a schematic block diagram of one embodiment of a gaming system network configuration including a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt (e.g., a symbol combination) in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Competition and Wagering Game

In one embodiment, the disclosed gaming system and method provide a competition game that operates concurrently with a wagering game. In one embodiment, the competition game includes a turn-based video game which enables a player to compete against an opponent, such as any suitable computer opponent, gaming system controlled opponent, or another one of the players playing at one of the gaming devices in the gaming system. Different generated symbol combinations for the wagering game represent different game events, actions or sequences for the competition game. The symbols or symbol combinations generated in the wager game determine which game events, actions or sequences the gaming system displays for the competition game.

In one embodiment, the gaming system determines the game events, actions or sequences and the result of the competition game based on the concurrent operated wagering game. That is, for the wagering game, the gaming system randomly generates one symbol combination for the player and randomly generates one symbol combination for the opponent. Based on the randomly generated symbol combinations, the gaming system determines one of the plurality of game events, actions or sequences for the competition game. The gaming system determines a result or outcome of the competition game between the player and the opponent based on such game events, actions or sequences.

In one embodiment, the disclosed gaming system and method sequentially displays: (i) at least one game event associated with the randomly generated symbol combination for the player, and (ii) at least one game event associated with the randomly generated symbol combination for the opponent. That is, the gaming system displays the competition game event resulting from the players turn before displaying the competition game event resulting from the opponent's turn, or vice versa.

In another embodiment, the disclosed gaming system and method randomly generates one symbol combination for each wager placed by the player for each play of the wagering game. In this embodiment, the gaming system enables the player to place at least one or more wagers within a designated period of time. The gaming system generates one or more symbol combinations within the designated period of time. The gaming system also generates one or more symbol combinations for the opponent within the designated period of time. Once the period of time expires, the gaming system processes the results of each of the randomly generated symbol combinations for the player and the results of each of the randomly generated symbol combinations for the opponent. In one embodiment, the gaming system displays the competition game events resulting from the player's turn before displaying the competition game events resulting from the opponent's turn, or vice versa.

In one embodiment, the gaming system generates one or more symbol combinations for the player and one or more symbol combinations for the opponent within a designated period of time. In one such embodiment, the player and the opponent race to cause as many symbol combinations to be randomly generated as possible in the designated period of time. The gaming system processes and displays the results of each of the randomly generated symbol combinations for the player and/or the opponent in real-time or substantially real-time (e.g., as such symbol combinations occur or are randomly generated).

Figure 3:
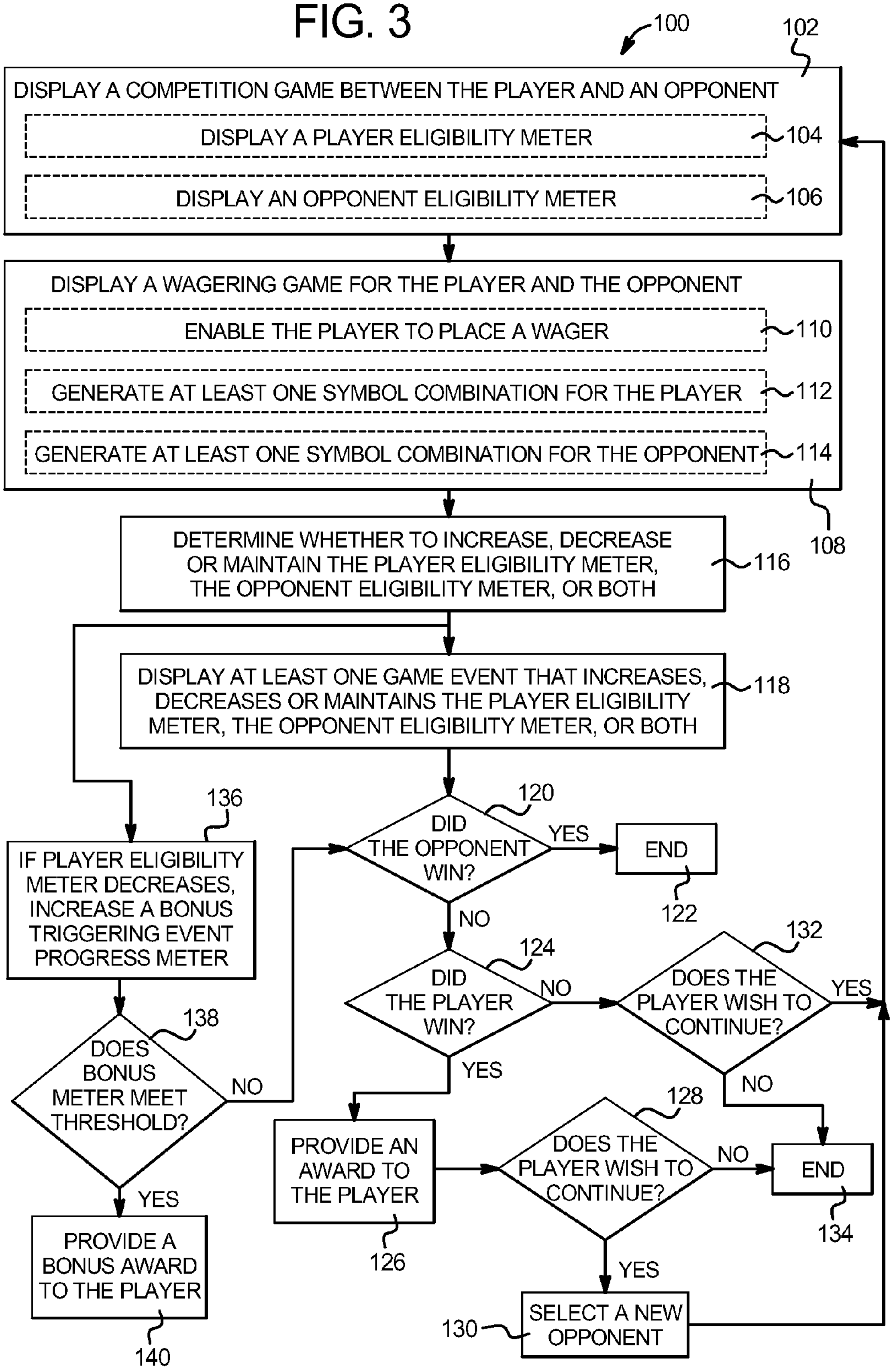
FIG. 3 is a process flow diagram showing one possible flow sequence of one embodiment of the disclosed gaming system.

Referring now to FIG. 3, a flowchart of an example process 100 for a gaming system or a gaming device to concurrently operate a competition game and a wagering game is illustrated. In one embodiment, the process 100 is embodied in one or more software programs stored in one or more memories and executed by one or more processors or controllers. Although the process 100 is described with reference to the flowchart illustrated in FIG. 3, it should be appreciated that many other methods of performing the acts associated with process 100 may be used. For example, the order of certain of the blocks described may be changed, or certain of the blocks described may be optional.

As indicated by block 102 of FIG. 3, one of the gaming devices in the gaming system displays a competition game on the display device. In one embodiment, the competition game is a turn-based video game which includes a plurality of possible rounds for the player. As described below, the player advances from one round to another round by winning a series of competitions against a designated opponent, wherein each competition includes a play of the wagering game that results in a randomly determined symbol combination for the player and a randomly determined symbol combination for the opponent.

As indicated by block 104, the gaming system causes the display device to display a player eligibility meter which graphically indicates the player's eligibility remaining for the competition game. As indicated by block 106, the gaming system causes the display device to display an opponent eligibility meter which graphically indicates the opponent's eligibility remaining for the competition game. In one embodiment, the gaming system displays the player eligibility meter and/or the opponent eligibility meter as a graphical representation of numerical values (e.g., life units) which indicate the player's eligibility and/or the opponent's eligibility remaining for the competition game. As described below, the player eligibility meter determines how long the player has until losing an opportunity to win an award. The opponent eligibility meter determines how long the player has until winning the award.

As described below, different game events for the competition game cause increases or decreases to the player eligibility meter, the opponent eligibility meter, or both. If the player eligibility meter decreases to zero, the player becomes ineligible for the competition game and the competition game ends for the player. However, if the opponent eligibility meter decreases to zero, the player defeats that round and the gaming system enables the player to advance to a subsequent round.

As indicated by block 108, the gaming system causes the display device to display a wagering game for the player and the opponent. The gaming system enables the player to place a wager, as indicated by block 110, for the wagering game. In one embodiment, the wager is funded from the credit display or credit meter associated with the gaming device being played by the player as described above. In one embodiment, the wager is funded from a paytable of an associated primary or base game (e.g., as a bonus game). In another embodiment, the wager is funded separate from the credit display or credit meter, such as via a side wager. In one embodiment, the player eligibility meter is linked to but not directly associated with the player's wager. For example, the player eligibility meter is based on coin-in while the player's wager for the wagering game is funded from the credit meter. In one embodiment, the player eligibility meter is linked to and directly associated with the player's wager for the wagering game. For example, the player eligibility meter funds the player's wager such that for each wager in the wagering game placed by the player, the gaming system decreases the player eligibility meter based on the wager placed by the player. In this example, the amount or size of the decrease is linked to, or directly associated with, the amount or size of the wager.

After receiving the wager, the gaming system randomly generates at least one symbol or symbol combination for the player, as indicated by block 112. The gaming system also randomly generates at least one symbol or symbol combination for the opponent, as indicated by block 114. For example, in a poker game, the gaming system enables the player to wager a designated number of credits on each of a number of poker hands and generates at least one symbol or symbol combination for each poker hand wagered on by the player. In another example, for a slot game, the gaming system enables the player to wager a designated number of credits on each of a number of paylines and generates at least one symbol or symbol combination for each payline wagered on by the player. In one embodiment, the gaming system generates the same number of symbols or symbol combinations for the player and the opponent. In another embodiment, the gaming system generates a first number of symbols or symbol combinations for the player and generates a second, different number of symbols or symbol combinations for the opponent.

Based on the randomly generated symbol combination for the player, the gaming system determines whether to provide the player an award, such as a credit value, a progressive award or any other suitable award. If the randomly generated symbol combination corresponds to a designated winning symbol combination, the gaming system determines to provide the player the award. Accordingly, a first function of the randomly generated symbol combination is to determine whether or not the player has won an award.

As indicated by block 116, the gaming system determines whether to increase, decrease or maintain the player eligibility meter, the opponent eligibility meter or both. This determination is based on at least one of the randomly generated symbol combination for the player and the randomly generated symbol combination for the opponent. In one embodiment, the gaming system associates at least one game event, action or sequence with each of a plurality of symbol combinations. If a designated one of the symbol combinations is randomly generated in the wagering game, the gaming system displays the associated game event, action or sequence for the competition game. Accordingly, a second function of the randomly generated symbol combination(s) is to determine a game event, action or sequence for the competition game.

In one embodiment, the gaming system determines whether to increase, decrease or maintain either the player eligibility meter or the opponent eligibility meter and subsequently determines whether to increase, decrease or maintain the player eligibility meter and the opponent eligibility meter. For example, the gaming system can randomly generate a symbol combination for the player (to determine whether to increase, decrease or maintain the opponent eligibility meter) without randomly generating a symbol combination for the opponent (e.g., if the opponent eligibility meter decreases to zero as a result of the randomly generated symbol combination for the player). By providing separate determinations for the player eligibility meter and the opponent eligibility meter, the gaming system implementer can increase the flexibility and game play of the competition game.

As indicated by block 118, the gaming system displays at least one game event for the competition game. The displayed game event either increases, decreases or maintains the player eligibility meter and/or the opponent eligibility meter depending on the symbols or symbol combinations randomly generated for the player and/or for the opponent. For example, if the gaming system randomly generates a first symbol combination in the wagering game for the player, the gaming system displays a first game event (e.g., an opponent eligibility meter decrease event) for the player in the competition game. An opponent eligibility meter decrease event (e.g., a hit) decreases the opponent eligibility meter, which is a positive outcome for the player. However, if the gaming system randomly generates a second, different symbol combination in the wagering game for the opponent, the gaming system displays a second, different game event (e.g., a player eligibility meter decrease event) for the opponent in the competition game. A player eligibility meter decrease event (e.g., a hit event) decreases the player eligibility meter, which is a negative outcome for the player. Other possible events include, but are not limited to: (i) a neutral event which does not change the player eligibility, (ii) a neutral event which does not change the opponent eligibility meter, (iii) a player eligibility meter decrease modifier event (e.g., a defend event) which modifies the amount the player eligibility meter decreases if the opponent obtains a player eligibility meter decrease event (e.g., a hit event) to decrease the player eligibility meter, (iv) a player eligibility meter increase event (e.g., a heal event) which increases the player eligibility meter, and (v) an opponent eligibility meter increase event (e.g., a heal event) which increases the opponent eligibility meter.

The randomly generated symbols or symbol combinations for the player and the randomly generated symbols or symbol combinations for the opponent determine which type of competition game event will occur, and the amount at which that event occurs. For example, if the gaming system randomly generates a first designated symbol combination in the wagering game for the player, the gaming system displays an opponent eligibility meter decrease event which decreases the opponent eligibility meter by a first amount or quantity. Continuing with this example, if the gaming system randomly generates a second designated symbol combination in the wagering game for the opponent, the gaming system displays a player eligibility meter decrease event which decreases the player eligibility meter by a second, different amount or quantity.

It should be appreciated that the gaming system can associate any number of the symbols or symbol combinations in the wagering game with any number of the above-described game events. For example, one symbol combination is associated with a player eligibility meter decrease event modifier (e.g., a defend event) while a plurality of symbol combinations are associated with an opponent eligibility meter decrease event (e.g., a hit event). By adjusting or varying the number of symbols or symbol combinations associated with each particular type of competition game event, the gaming system implementer can control the probabilities of such competition game events. It should be appreciated that for different rounds, or at different points in time during the competition game, the gaming system can adjust or change the probabilities of generating such competition game events, the symbols or symbol combinations associated with such competition game events, the generation of such symbols or symbol combinations, and any paytable associated with such symbols or symbol combinations for the wagering game and/or the competition game.

In one embodiment, the gaming system implementer can increase the difficulty of one or more of the rounds by adjusting or changing the probabilities of generating such competition game events, the symbols or symbol combinations associated with such competition game events and the generation of such symbols or symbol combinations. For example, a first round is associated with a first difficultly level while a second, subsequent round is associated with a second, higher difficultly level.

It should also be appreciated that certain designated symbols or symbol combinations in the wagering game and/or that certain designated game events in the competition game can be available for the player while not being available for the opponent, or vice versa. For example, a player eligibility meter decrease modifier event (e.g., a defend event) is highly advantageous to the player because this event modifies the amount by which the player eligibility meter decreases if the opponent obtains a player eligibility meter decrease event. Due to this advantage, in one embodiment, the player eligibility meter decrease modifier event is only available to the player and a similar competition game event is not available to the player's opponent.

The gaming system monitors the player eligibility meter and the opponent eligibility meter throughout the competition game. If either eligibility meter decreases to zero, the competition between the player and the opponent ends. The gaming system determines whether the player or the opponent wins the competition game based on any changes to the player eligibility meter and/or the opponent eligibility meter. Such changes occur through one or more iterations of the process indicated by blocks 104 to 118. That is, for each wager placed by the player, the gaming system displays the player eligibility meter, displays the opponent eligibility meter, generates a symbol or symbol combination for the player, generates a symbol or symbol combination for the opponent, and displays one or more game events resulting in an increase, a decrease or no change to the player eligibility meter and/or the opponent eligibility meter.

As indicated by block 120 of FIG. 3, the gaming system determines if the opponent wins the competition. The opponent wins the competition if the player eligibility meter decreases to zero. If the player eligibility meter decreases to zero, the player becomes ineligible for the competition game. In this instance, the gaming system ends the competition game, as indicated by block 122. If the opponent does not win the competition, the gaming system determines if the player wins the competition, as indicated by block 124. The player wins the competition game if the opponent eligibility meter decreases to zero. If the player wins the competition game, as indicated by block 126, the gaming system provides an award to the player. In one embodiment, the award includes, but is not limited to, a credit value, a progressive award, a physical award (e.g., a car), a theme, a different paytable (e.g., one with a higher payback percentage), a bonus game, a bonus triggering event, a quantity of points (to determine a player's ranking), adjusted probabilities of generating designated symbols or symbol combinations (e.g., higher), a set of graphics, a sound, a set of sounds, a video, a set of videos, any combination of these awards, or any other suitable award.

In one embodiment, the award includes an upgraded competition game feature. In one such embodiment, the upgraded competition game feature includes any suitable modification of one or more characteristics related to any one of the game events which result from the symbol or symbol combinations randomly generated for the player in future plays of the wagering game. For example, one upgraded competition game feature includes a multiplier or modifier which increases the amount by which the opponent eligibility meter decreases for certain competition game events (e.g., hit events) resulting from the symbol or symbol combinations randomly generated for the player in future plays of the wagering game. In this example, a first competition game event is associated with a first range of values (e.g., from five to twenty life units) and a modified first competition game event is associated with a modified first range of values (e.g., ten to thirty life units). Another upgraded competition game includes a multiplier or modifier which decreases the amount by which the player eligibility meter decreases (e.g., defend events) for certain competition game events resulting from the symbol or symbol combinations randomly generated for the player's opponent in future plays of the wagering game.

In one embodiment, if the player wins the competition game (or wins a designated round of the competition game, such as a final round), the gaming system enables the player to access certain awards or other suitable features or benefits previously unavailable to the player. In different embodiments, the features or benefits includes, but are not limited to, a theme, a different paytable (e.g., a different payback percentage, different award probabilities and/or different awards), a graphic, a sound, a video, a set of graphics, sounds and/or videos (e.g., animations), a designated opponent, or any suitable combination of these elements. For example, the gaming system enables (or otherwise activates) a first theme in association with a first play (e.g., a first round) of the competition game and disables (or otherwise deactivates) a second theme and a third theme for the first play of the competition game. In this example, if the player wins the first play (or round) of the competition game, the gaming system enables the second theme (which was previously unavailable to the player) for a second or subsequent play of the competition game.

In one embodiment, the gaming system associates a plurality of awards, features or benefits with the competition game. In one such embodiment, at a first point in time, a first one of the awards, features or benefits is available to the player and a second one of the awards, features or benefits is unavailable to the player. At a second point in time, such as after a designated event (e.g., the player winning a round, such as the final round), the gaming system causes the first and second features or benefits to be available to the player in a subsequent play of the competition game.

In one embodiment, the gaming system determines which award, feature or benefit to make available to the player based on a player input or selection. For example, the gaming system displays a list of awards, features or benefits which were previously unavailable to the player and enables the player to select one or more of the features or benefits from the displayed list to make available to the player. In different embodiments, the determination of which feature or benefit is made available to the player is randomly determined, predetermined, determined based on the player's player tracking status (as determined through a suitable player tracking system), determined based on a wager, determined based on time, or determined based on another suitable method.

In one embodiment, the gaming system stores or otherwise accounts for which features or benefits are available to each player playing at one or more gaming devices in the gaming system. In one such embodiment, the gaming system cooperates with a suitable player tracking system to store or otherwise account for which features or benefits are available to each player in association with a player tracking card or player tracking account. In one embodiment, the features or benefits available to each player expire after a designated amount of time (e.g., one day, one week, or one month) or after a designated amount of inactivity by the player (e.g., not playing at one of the gaming devices in the gaming system for a designated period of time, such as one day, one month or one year).

After the gaming system provides the player the award, the gaming system prompts the player to continue the competition game, as indicated by block 128. If the player does not want to continue, the gaming system enables the player to cash out and ends the competition game, as indicated by block 134. However, if the player chooses to continue the competition game, the gaming system enables the player to compete against another opponent. As indicated by block 130, the gaming system selects a new opponent for the player to compete against in a subsequent round of the competition game.

If neither the player nor the opponent wins the competition, the gaming system prompts the player to continue the competition game, as indicated by block 132. If the player chooses to continue the competition game, the gaming system displays the player eligibility meter and the opponent eligibility meter and enables the player to place another wager for another play of the wagering game. If the player does not want to continue, the gaming system enables the player to cash out and ends the competition game, as indicated by block 134.

In one embodiment, after the gaming system determines whether to increase, decrease or maintain the player eligibility meter, the gaming system determines whether to increase a bonus triggering event progress meter based on the randomly generated symbol combinations for the player and the opponent. In one embodiment, if the gaming system decreases the player eligibility meter, the gaming system increases the bonus triggering event progress meter, as indicated by block 136. In this embodiment, the gaming system modifies the bonus triggering event progress relative to the player eligibility meter. For example, when the gaming system decreases the player eligibility meter, the gaming system increases the bonus triggering event progress meter. In one embodiment, the bonus triggering event progress meter increases until the bonus triggering event occurs (regardless of whether one or more players play at the gaming device to cause the bonus event to occur). In an alternative embodiment, the gaming system modifies the bonus triggering event progress meter in an inversely proportional relationship to the player eligibility meter. In one such embodiment, the gaming system increases the bonus triggering event progress meter when the gaming system decreases the player eligibility meter, and the gaming system decreases the bonus triggering event progress meter when the gaming system increases the player eligibility meter.

After the gaming system determines to increase the bonus triggering event progress meter, the gaming system determines an amount of the increase. In one embodiment, the amount that the gaming system increases the bonus triggering event progress meter is based on the amount that the player eligibility meter decreases. For example, if the player eligibility meter decreases by five units or percentage points, the bonus triggering event progress meter increases by five units or percentage points. That is, regardless of whether the player wins or loses for any particular competition (e.g., a play of the wagering game), each play of the wagering game benefits the player because the gaming system enables the player to progress toward the bonus event in the competition game.

In another embodiment, the bonus triggering event progress meter increases based on the amount that the player eligibility meter is decreased and based on the amount that the opponent eligibility meter is decreased. For example, if the player eligibility meter decreases by five percent, and the opponent eligibility meter decreases by five percent, the bonus triggering event progress meter increases by ten percent.

As indicated by block 138, the gaming system determines whether the player qualifies for a bonus event. The gaming system enables the player to qualify for a bonus event if the bonus triggering event progress meter in the competition game reaches a designated value or threshold. When the bonus triggering event progress meter reaches the designated value or threshold, the bonus triggering event occurs and the gaming system provides a bonus award to the player, as indicated by block 140.

In one embodiment, if the bonus triggering event progress meter reaches the designated value or threshold, the bonus event provides the player with at least one additional randomly generated symbol combination which results in at least one additional competition game event for the player. In one embodiment, the bonus event provides the player a free play of the wagering game (or a modified version of the wagering game) which results in a free turn for the competition game. In this embodiment, when the player qualifies for the bonus event, the gaming system does not randomly generate a symbol or symbol combination for the opponent, and thus, does not display a competition game event for the opponent. Because the gaming system provides the player with an extra or free turn in the competition game, the bonus event provides the player an advantage over the opponent.

In one embodiment, if the bonus triggering event progress meter increases to the designated value, the bonus triggering event occurs. In another embodiment, once the bonus triggering event progress meter increases to the designated value, the gaming device enables the player to selectively activate or trigger the occurrence of the bonus triggering event. Upon the occurrence of the bonus triggering event, the gaming system displays the bonus event to the player. In one embodiment, the bonus event provides the player with at least one additional symbol generator, additional symbol and/or additional paylines for the wagering game. In one such embodiment, the bonus event includes a modified wagering game that randomly generates at least one additional symbol combination for the player. In this embodiment, the modified wagering game includes at least one symbol combination which was not previously available for the wagering game. For example, if the wagering game is a slot game, the gaming system displays three reels and nine paylines (e.g., 3×3) which randomly generate symbol combinations for the player and the opponent. In this example, the gaming system displays the bonus event as a modified slot game having additional reels and paylines (e.g., 3×5). The additional reels and paylines increase the player's chance to decrease the opponent eligibility meter (which, in turn, increases the player's chance of winning the competition against the opponent). In another example, for a poker game, if the wagering game includes a plurality of five card poker hands, the bonus event includes a plurality of seven or eight card poker hands to increase the player's chances of obtaining a symbol combination that will result in a positive competition game event.

In one embodiment, at least one symbol combination associated with the wagering game has a higher probability of occurring during the bonus event. This higher probability increases the player's chance of winning the competition game against the opponent.

In another embodiment, at least one symbol combination generated during the bonus event results in a modified competition game event. For example, in the bonus event, a designated symbol combination results in an opponent eligibility meter decrease event (e.g., a hit event) that decreases the opponent eligibility meter to zero. In this example, regardless of whether the opponent has 100 life units or 500 life units remaining in the opponent eligibility meter, the bonus event enables the player to defeat the opponent in one turn of the competition game.

Figure 4:
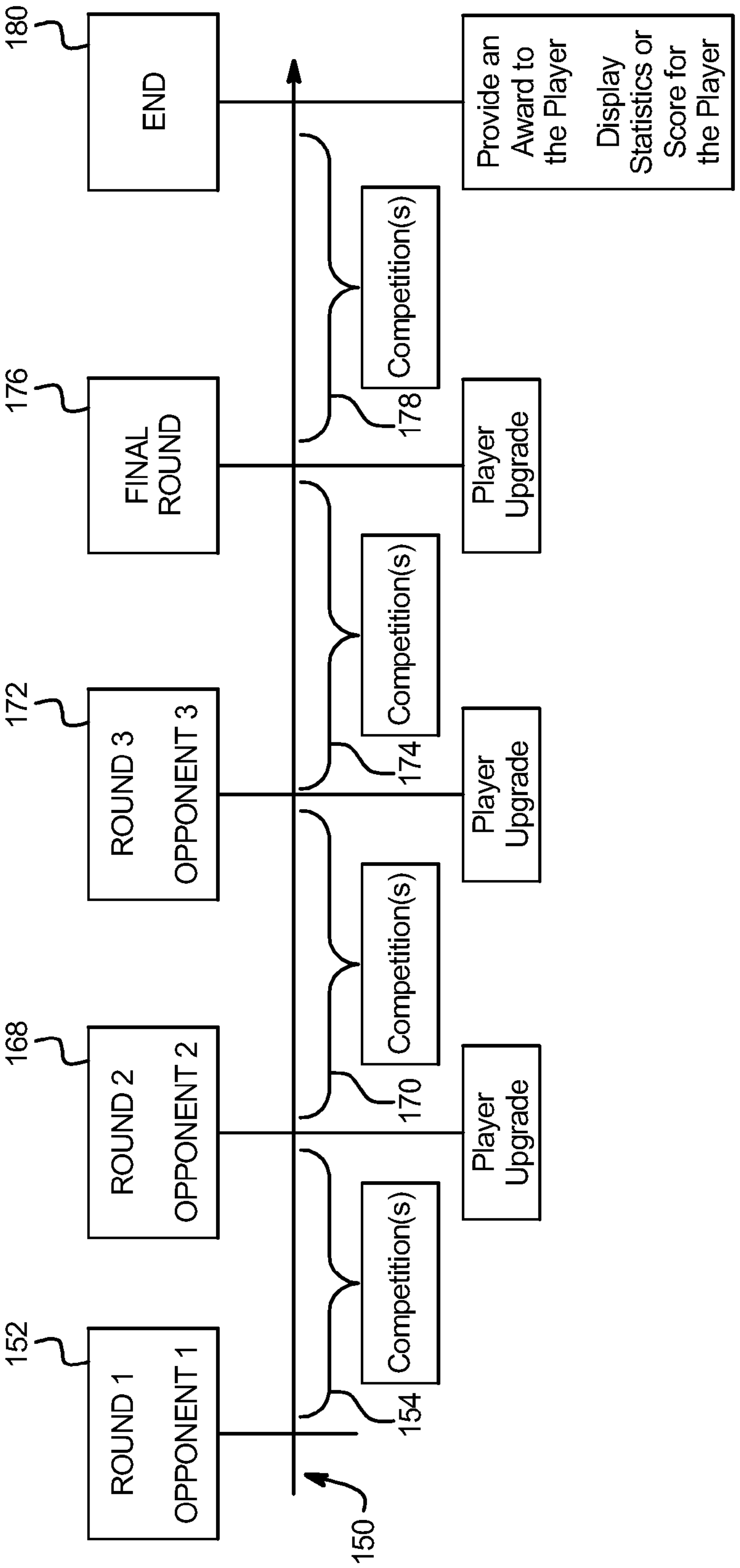
FIG. 4 is a timeline showing one embodiment of the competition game having a plurality of rounds including a final round.

Referring now to FIG. 4, a timeline 150 of an example competition game is illustrated. In this example, the competition game includes a designated number of rounds (e.g., four) including a final round. Each round of the competition game is associated with a different opponent. For each round, the player and the opponent engage in a series of competitions (e.g., plays of the wagering game). For each competition, the gaming system randomly generates any symbol combination for the player, randomly generates one symbol combination for the opponent, and displays a competition game event resulting from a comparison of the generated symbol combination for the player and the generated symbol combination for the opponent.

At a first point in time 152, the gaming system starts a first round. The first round is associated with a first opponent. The first opponent is associated with a first opponent eligibility meter having a first value (e.g., a first number of life units). The player is associated with a player eligibility meter having an initial value (e.g., a designated number of life units). In one embodiment, the player eligibility meter resets to the initial value after each successful round. That is, if the player advances to a second round, the player eligibility meter resets to the initial value for the second round. In another embodiment, the gaming system does not reset the player eligibility meter for successful completion of each round. At a first period of time 154, the gaming system conducts a series of competitions. The series includes one or more competitions. Each competition includes one play of the wagering game and its corresponding result in the competition game.

Figure 5:
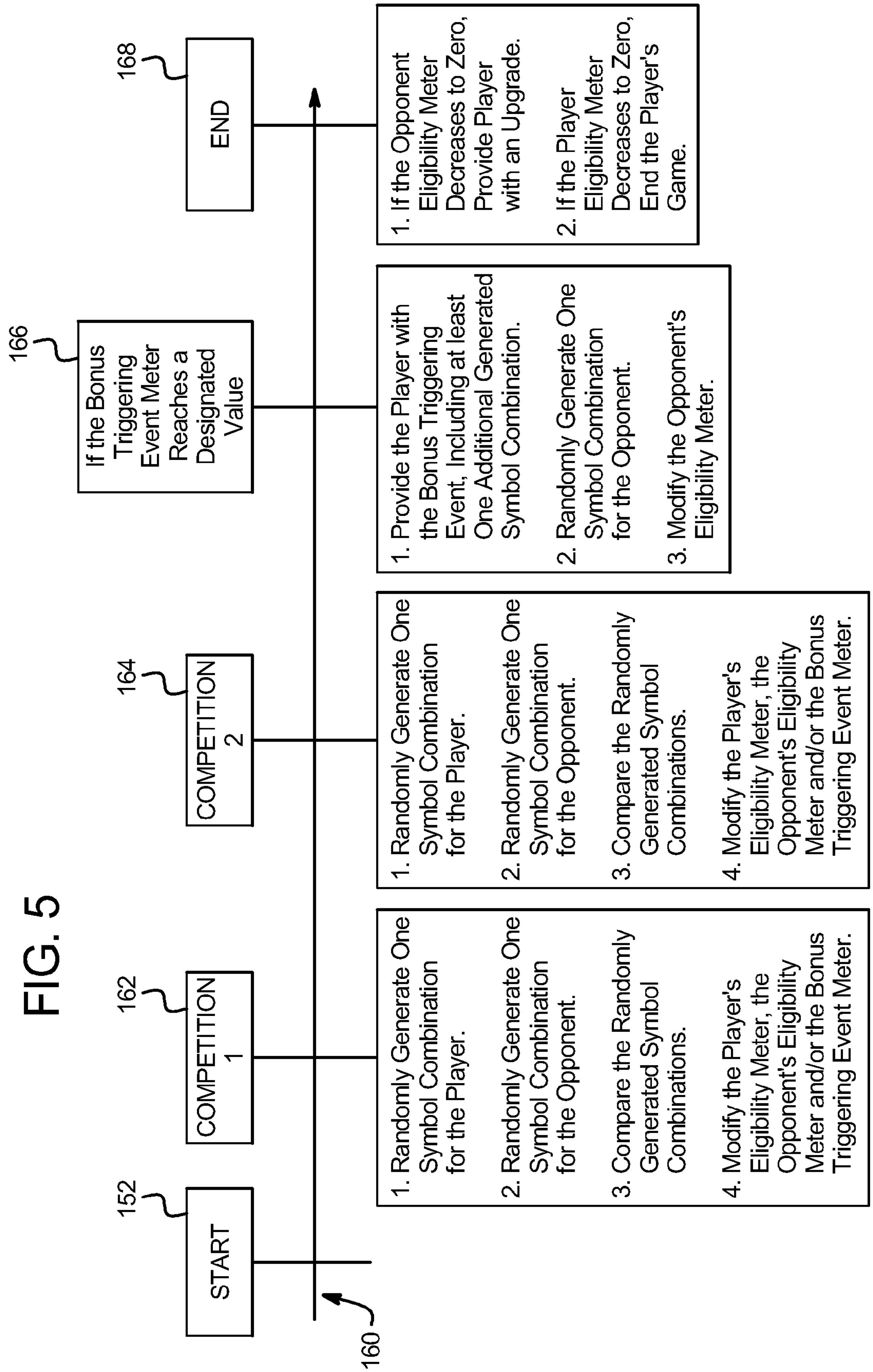
FIG. 5 is a timeline showing one embodiment of the competition game and the wagering game.

Referring now to FIG. 5, a timeline 160 showing a series of competitions for one round of the competition game. Timeline 160 begins at the same point in time 152 as timeline 150 illustrated in FIG. 4. For timeline 160 illustrated in FIG. 5, points in time 162, 164 and 166 correspond to the series of competitions illustrated at the first period of time 154 of timeline 150. Points in time 162 and 164 represent example competitions in the series. That is, for each competition, the gaming system randomly generates one symbol combination for the player and one symbol combination for the opponent. The gaming system also displays a competition game event resulting from the randomly generated symbol combination for the player and a competition game event resulting from the randomly generated symbol combination for the opponent. In this embodiment, each randomly generated symbol combination (for either the player or the opponent) is associated with an action (e.g., whether the gaming system decreases the opponent eligibility meter) and an amount of change resulting from that action. For example, if the player obtains an opponent eligibility meter decrease event (e.g., a hit event) which decreases the first opponent eligibility meter by a designated amount of life units (e.g., by 8 life units or by 8%), the gaming system displays the hit event to decrease the first opponent eligibility meter by 8 life units or 8%.

In one embodiment, the gaming system compares the symbol combination randomly generated for the player with the symbol combination randomly generated for the opponent. Based on the comparison, in this embodiment, the gaming system determines a competition game event resulting from the randomly generated symbol combinations. For example, one competition results in the player obtaining a player eligibility meter decrease modifier event (e.g., a defend event) which modifies the amount the player eligibility meter decreases if the opponent obtains a player eligibility meter decrease event (e.g., a hit event). In this example, the competition also results in the opponent obtaining a player eligibility meter decrease event (e.g., a hit event) which decreases the player eligibility meter by twenty life units. Based on the comparison, the gaming system modifies the amount the player eligibility meter decreases because the player's player eligibility meter decrease modifier event mitigates the opponent's player eligibility meter decrease event (e.g., a hit event). For example, instead of decreasing the player eligibility meter by twenty life units, the gaming system decreases the player eligibility meter by one life unit because the player obtained the player eligibility meter decrease modifier event.

At the end of each competition, the gaming system determines whether any changes occurred to the player eligibility meter and/or the opponent eligibility meter. The gaming system graphically indicates these changes on the display device, such as, through one or more animated game events, actions or sequences. For example, the gaming system displays an animation event, action or sequence which shows the opponent striking the player and the player defending the hit or strike. Such animation results in the player eligibility meter being reduced from the initial value to the initial value minus one life unit to account for the players defend event (which in this example reduced the effect of the opponent's hit event). In this example, the animation results in the display of the opponent eligibility meter with the initial value because the defend event did not modify the opponent eligibility meter.

For each competition, as illustrated at point in time 166, the gaming system determines whether the player qualifies for a bonus event. As described above with respect to block 138 of FIG. 3, the gaming system enables the player to qualify for a bonus event if the bonus triggering event progress meter in the competition game reaches a designated value or threshold. If the bonus triggering event progress meter reaches the designated value or threshold, the bonus triggering event occurs, as described above with respect to block 140 of FIG. 3. In one embodiment, the gaming system provides a bonus award to the player. In another embodiment, the gaming system enables the player to selectively cause the gaming system to provide the bonus award.

At point in time 168 illustrated in FIGS. 4 and 5, the series of competitions ends. The series of competitions ends when: (i) the player quits the competition game and cashes out, (ii) the player eligibility meter decreases to zero life units remaining from the initial value, or (iii) the opponent eligibility meter decreases to zero life units. If the opponent eligibility meter decreases to zero, the player advances to a subsequent round.

At the point in time 168, the player defeated the first opponent and advanced to a second round. For defeating the first opponent, the gaming system causes a first upgraded competition game feature to be provided to the player. After providing the player the first upgraded competition game feature, the gaming system starts the second round. The second round is associated with a second opponent. In one embodiment, the second opponent is different from the first opponent and is associated with an opponent eligibility meter having a different value (e.g., a second, different number of life units) than the opponent eligibility meter associated with the first opponent. In one embodiment, the player eligibility meter is reset to the initial value for each round. In one embodiment, the player eligibility meter is reset to the initial value after a plurality of rounds. In one embodiment, the player eligibility meter is reset to the initial value for each round except a final round. In another embodiment, the player eligibility meter is not reset to its initial value for one or more rounds.

At point in time 164, the gaming system conducts a series of competitions. The series includes one or more competitions and continues until: (i) the player quits the competition game and cashes out, (ii) the player eligibility meter decreases to zero life units remaining from the initial value, or (iii) the opponent eligibility meter decreases to zero life units remaining from the second value. If the opponent eligibility meter decreases to zero, the player advances to a subsequent round.

The competition game operates substantially the same at fifth, sixth, seventh, and eighth points in time 152, 168, 172 and 176 as described above with respect to points in time 162 and 164. It should be appreciated that at the points in time 174 and 176, the player defeated a third opponent to advance to a final round. The final round operates in substantially the same manner as the first, second, and third rounds. For the final round, the gaming system conducts a series of competitions. The series includes one or more competitions and continues until: (i) the player quits the competition game and cashes out, (ii) the player eligibility meter decreases to zero life units remaining from the initial value, or (iii) the opponent eligibility meter decreases to zero life units. If the opponent eligibility meter decreases to zero, the player has defeated the competition game and the competition game ends.

In one embodiment, the gaming system provides an award to the player. In this embodiment, the award differs from the upgraded competition game features won by the player for defeating earlier rounds. Unlike the upgraded competition game features of earlier rounds, the award is a credit value, a progressive award, a physical prize, such as a car or motorcycle, or any other suitable prize. It should be appreciated that the gaming system can provide the player an award in addition to, or in lieu of, the upgraded competition game features for defeating any one or more of the rounds of the competition game.

If the player defeats the competition game, in one embodiment, the gaming system causes the display device of the gaming device being played by the player to display any suitable statistics achieved by the player throughout the competition game. For example, the gaming system displays player statistics, such as a number of upgraded competition game features achieved, a number of rounds cleared or advanced, or a number of life units remaining. In another embodiment, the gaming system displays such statistics when the player cashes out, or after the player eligibility meter reduces to zero.

In one embodiment, the gaming system converts the player statistics into a score which can be compared amongst other players. For example, the gaming system scores each player who plays the competition game based on the statistics achieved during the competition game. In this embodiment, the gaming system ranks a plurality of players relative to one another based on the scores achieved by those players in the competition game. In one embodiment, the gaming system displays a ranking list and/or scores at one of the gaming devices or on a common display device associated with a plurality of gaming devices.

In one embodiment, the gaming system associates at least one different characteristic with each one of the different opponents. For example, the opponent in the first round has a lower amount of eligibility than the opponent in the second round. Accordingly, the opponent in the first round is affected more by opponent eligibility meter decrease events from the player than the opponent in the second round. In another example, the opponent in the third round is associated with higher probabilities for designated game events than the opponent in the first round. That is, the opponent in the third round has an increased probability to obtain certain designated game events, such as player eligibility meter decrease events. Accordingly, the opponent in the third round would obtain hit events to decrease the player eligibility meter more often than the opponent in the first round. In another example, the opponent in the final round is associated with higher amounts for designated game events than any other of the other opponents in the other rounds. That is, the player eligibility meter decrease events result in a larger decrease of the player eligibility meter.

Figure 6:
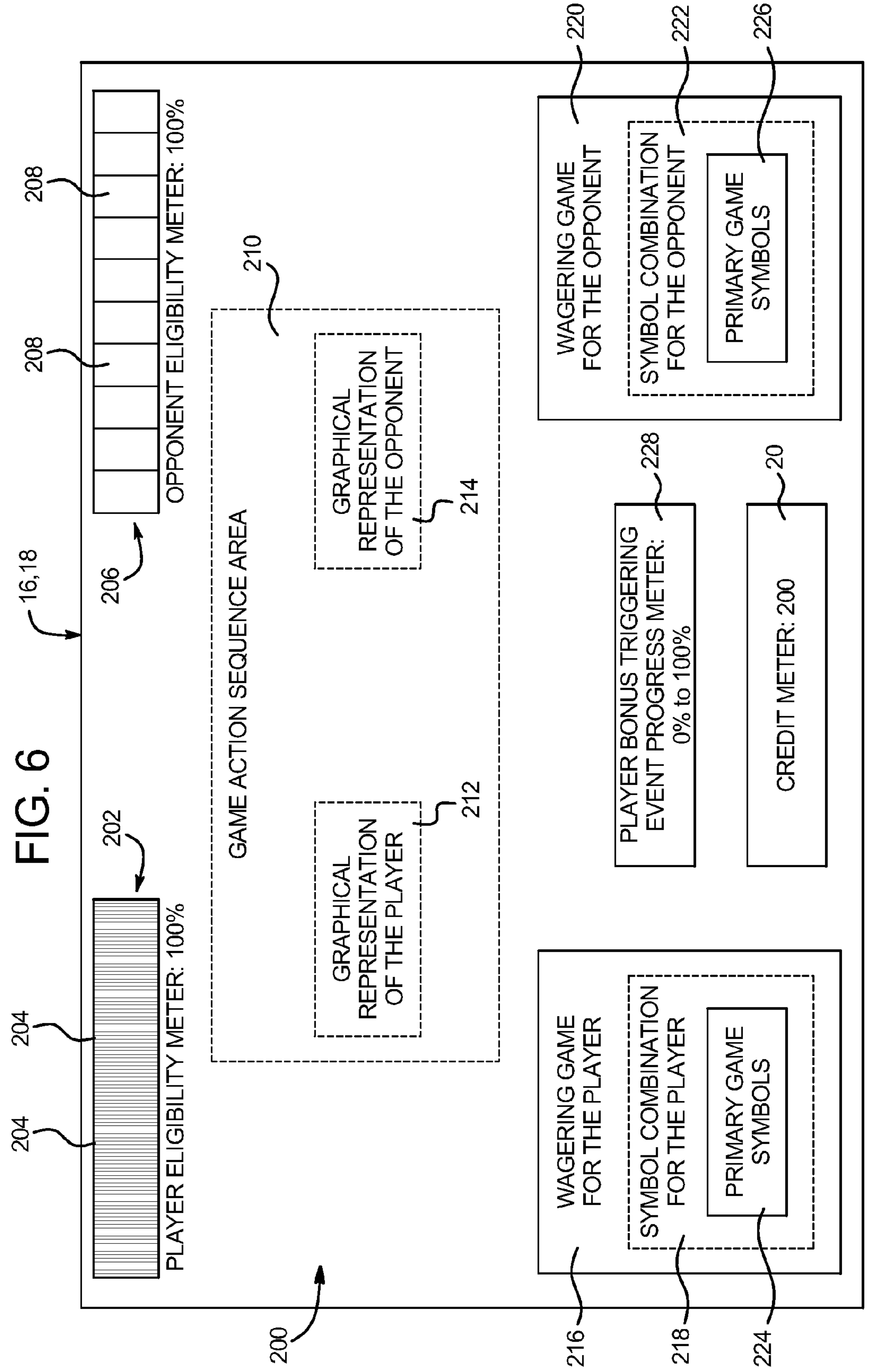
FIG. 6 is a front plan view of one gaming device in accordance with one embodiment of the disclosed gaming system.

Referring now to FIG. 6, at least one display device 16 or 18 of one gaming device is illustrated in accordance with one embodiment of the disclosed gaming system. As described above, the gaming device includes at least one display device 16 or 18 and a credit display or credit meter 20. It should be appreciated that the display device 16 or 18 illustrates one example of a game play screen for one embodiment of the concurrent competitive and wagering games described herein. For ease of illustration, the relevant game information for the games is shown on one display device 16 or 18 of one of the gaming machines 10. In alternative embodiments, the relevant game information for the game is divided between different areas of the gaming machine 10 or the display devices 16 and 18.

In one embodiment, after appropriate funding of the gaming device, the display device 16 displays a competition game 200 concurrently with a wagering game 216. The competition game 200 enables the player to compete against one opponent in each of a plurality of rounds. The display device 16 displays a player eligibility meter 202 associated with the player for the competition game. The player eligibility meter 202 includes a plurality of life units 204. The display device 16 also displays an opponent eligibility meter 206 associated with the opponent for the competition game. The opponent eligibility meter 206 includes a plurality of life units 208.

In the embodiment illustrated in FIG. 6, the player eligibility meter 202 and the opponent eligibility meter 206 both indicate values of one-hundred percent. In this embodiment, the player eligibility meter 202 includes one-hundred life units and the opponent eligibility meter 206 includes ten life units. This embodiment is representative of the beginning of a first round of the competition game 200 where the credit meter 20 shows that the player has inserted two-hundred credits into the gaming device. In another embodiment (not shown), the player eligibility meter 202 indicates a value of fifty-percent and the opponent eligibility meter 206 indicates a value of one-hundred percent. In this embodiment, the player eligibility meter 202 includes fifty life units and the opponent eligibility meter 206 includes one-hundred life units. This embodiment is representative of the beginning of a final round of the competition game 200, where the player eligibility meter is not reset at the beginning of each round and the player eligibility meter 202 has decreased after competing against a number of opponents.

The display device 16 also displays a competition game action sequence area 210 where a graphical representation of the player 212 competes against a graphical representation of the opponent 214. For example, a computer-generated character representing the player competes against a computer-generated character representing the opponent. The competition game action sequence area 210 indicates at least one game event, action or sequence between the graphical representation of the player 212 and the graphical representation of the opponent 214. It should be appreciated that the display device 16 displays the game events, actions, sequences or animations for the competition game in the competition game action sequence area 210.

The display device 16 displays a wagering or primary game for the player 216. The wagering or primary game 216 randomly generates at least one symbol or symbol combination 218 for the player. The display device 16 also displays a wagering or primary game for the opponent 220. The wagering or primary game 220 randomly generates at least one symbol or symbol combination 222 for the opponent. As illustrated in FIG. 6, the wagering or primary games 216 and 220 randomly generate one or more suitable primary game symbols 224 and 226 (e.g., reel symbols, cards, or bingo elements) which form the randomly generated symbol combinations 218 and 222 (e.g., reel symbol combinations, poker hands or bingo outcomes).

The display device 16 also displays a player bonus triggering event progress meter 228 which indicates the player's progress toward triggering a bonus event. As illustrated in FIG. 6, the bonus triggering event occurs if the player bonus triggering event progress meter 228 increments from an initial value, such as zero percent, to a designated value, such as one-hundred percent. In this embodiment, the bonus triggering event progress meter 228 increments relative to any decrements of the player eligibility meter 202. In one embodiment, the bonus triggering event progress meter 228 continues to increment for each round until the bonus triggering event occurs.

Figure 7:
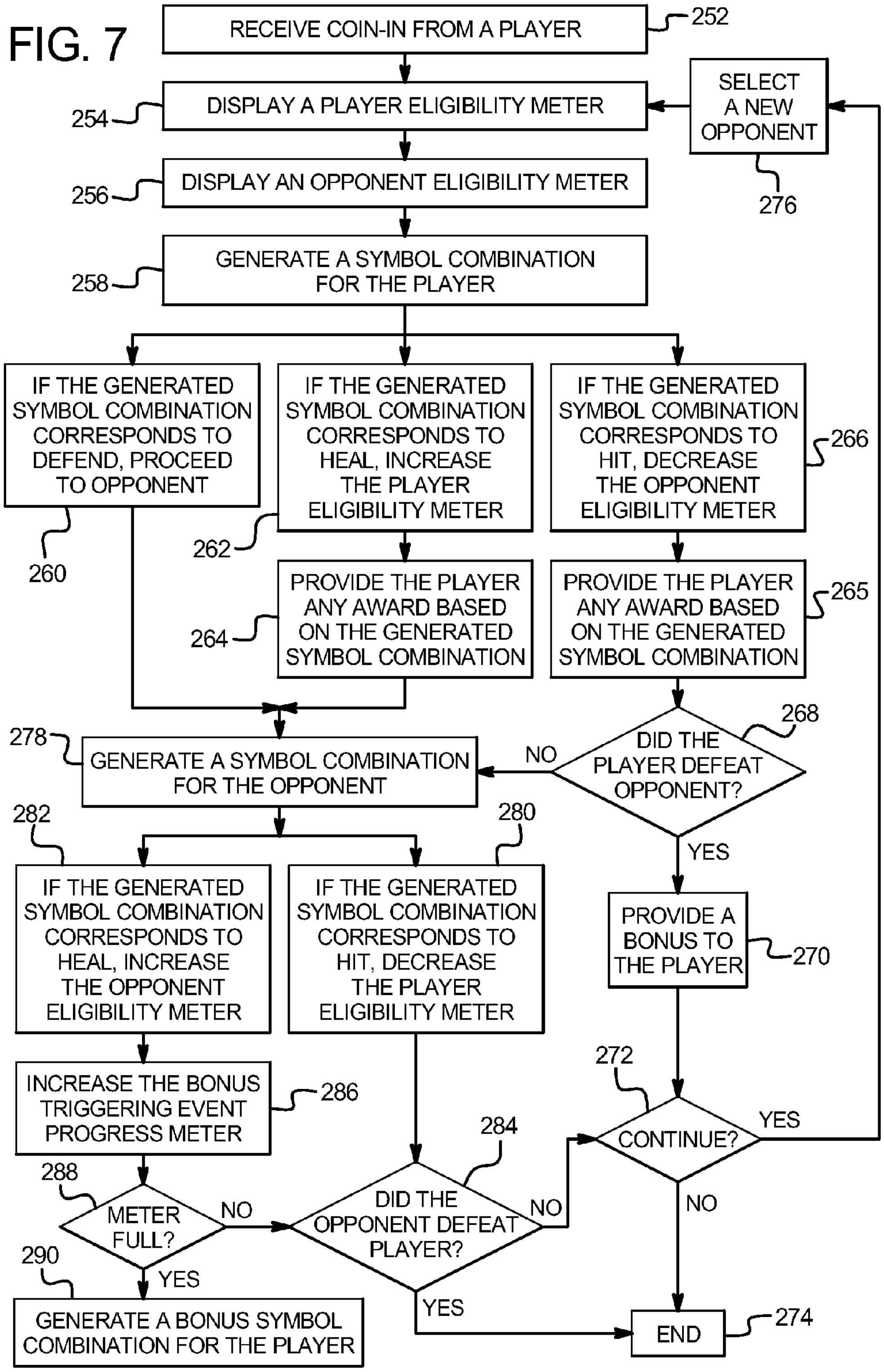
FIG. 7 is a process flow diagram showing one possible flow sequence of one embodiment of the disclosed competition game and wagering game.

Referring now to FIG. 7, a flowchart of an example process 250 for a gaming system or a gaming device to concurrently operate a competition game and a wagering game is illustrated. In one embodiment, the process 250 is embodied in one or more software programs stored in one or more memories and executed by one or more processors or controllers. Although the process 250 is described with reference to the flowchart illustrated in FIG. 7, it should be appreciated that many other methods of performing the acts associated with process 200 may be used. For example, the order of certain of the blocks described may be changed, or certain of the blocks described may be optional.

The process 250 starts at block 252. As indicated by block 252, the gaming system receives a designated wager from one of the players at one of the gaming devices in the gaming system. The credit meter of the gaming device displays the amount of credits available to be wagered by the player. As indicated by blocks 254 and 256, the gaming device displays a player eligibility meter and an opponent eligibility meter associated with the competition game. As described above, these eligibility meters graphically represent the player's eligibility and the opponent's eligibility for the competition game. In one embodiment, each of the player eligibility meter and the opponent eligibility meter initially start at one-hundred percent.

In one embodiment, the gaming device associates a designated number of life units with the player eligibility meter and/or the opponent eligibility meter. In one such embodiment, the number of life units associated with the player eligibility meter and/or the opponent eligibility meter is graphically indicated as a percentage. In one example, the player eligibility meter indicates one-hundred percent, and each life unit equals one-half percent of the player eligibility meter. In this example, if the opponent obtains a hit event that decreases the player eligibility meter by ten life points (based on the randomly generated symbol in the wagering game for the opponent), the gaming device indicates the player eligibility meter decreased by five percent (e.g., 1 life points per ½ percent).

In one embodiment, the number of life units associated with the player eligibility meter and/or the opponent eligibility meter is based on the round of the competition game. For example, for a first round, the gaming device associates a first number of life units with the opponent eligibility meter and for a second, subsequent round, the gaming device associates a second, higher number of life units with the opponent eligibility meter. Referring now to the embodiment illustrated in FIG. 9, look-up table 310 illustrates that different opponents are associated with different predetermined amounts of life units. As illustrated in FIG. 8, a first one of the opponents (e.g., Boss #1) is associated with ten life units while a second one of the opponent (e.g., Boss #10) is associated with 100 life units.

In another embodiment, the number of life units associated with the player eligibility meter and/or the opponent eligibility meter is randomly determined. For example, the gaming device randomly picks the number of life points associated with the player eligibility meter from a designated range. One example range is one-hundred life points to five-hundred life points. Based on this example range, the gaming device randomly selects one life point value between one-hundred and five-hundred from the range to associate with the player eligibility meter. In one embodiment, certain groups (e.g., 100 to 200 or 450 to 500) or specific values (e.g., 340 or 407) of life points are weighted more heavily than others so that those groups or values are selected more often.

In one embodiment, the gaming device determines the number of life units associated with the player eligibility meter based on the player's coin-in or amount wagered (e.g., a placed wager). In this embodiment, the look-up table 300 illustrated in FIG. 8 associates a designated percentage of the player eligibility meter with each individual life unit. In one embodiment, the gaming system converts the coin-in inserted by the player (or the amount wagered by the player) into life units based on look-up table 300. Table 300 is based on a conversion factor of one dollar of coin-in for one life unit. For example, based on table 300, the gaming device displays a player eligibility meter having 500 life units if the player of that gaming device inserts $500 of coin-in. It should be appreciated that the gaming system implementer could set the conversion factor to be greater or less than one dollar of coin-in for one life unit. For example, based on a different conversion factor (e.g., one penny of coin-in for one life unit), the gaming device provides a player who inserts $10 of coin-in with 100 life units. In this example, the percent of the player eligibility meter represented by each life unit is one percent.

In different embodiments, the conversion factor and/or the number of life units associated with the player eligibility meter is randomly determined, predetermined, determined based on the player's player tracking status (as determined through a suitable player tracking system), determined based on a wager, determined based on time, or determined based on another suitable method.

In one embodiment, the gaming device converts any credits stored in the credit meter 20 into life units based on table 300 (with the same or a different conversion factor). In this embodiment, wagers placed by the player for the wagering game decrease the player eligibility meter by a designated amount of life units. Any awards obtained by the player increase the player eligibility meter by a designated amount (in addition to heal events). In this embodiment, if a player wishes to cash out, the gaming device converts any remaining life units into credits. For example, if the conversion rate is one dollar for each life unit and the player has fifty life units remaining, the gaming device enables the player to cash out fifty dollars.

Referring now to FIGS. 7 and 10A, the gaming device generates a symbol combination for the player, as indicated by block 258. Chart 320 illustrated in FIG. 10A shows a plurality of competition game events in accordance with one embodiment of the disclosed gaming device. Each competition game event is associated with a range of values (e.g., percentages or life units), which represent an amount of change for the player eligibility meter. Referencing chart 320, if a neutral event results from the symbol combination randomly generated for the player in the wagering game, the opponent eligibility meter reflects no change. If an opponent eligibility meter decrease event (e.g., a hit event) results from the symbol combination randomly generated for the player in the wagering game, the opponent eligibility meter reflects a change between 1% and 100%. That is, the opponent eligibility meter decreases by 1% (e.g., at a minimum hit value) to 100% (e.g., at a maximum hit value). As described above, in one embodiment, the gaming device converts each percentage of the opponent eligibility meter into a number of life units. Based on a conversion rate of one life unit per one percent of the opponent eligibility meter, the opponent eligibility meter decreases between 1 life unit and 100 life units.

Figure 10B:
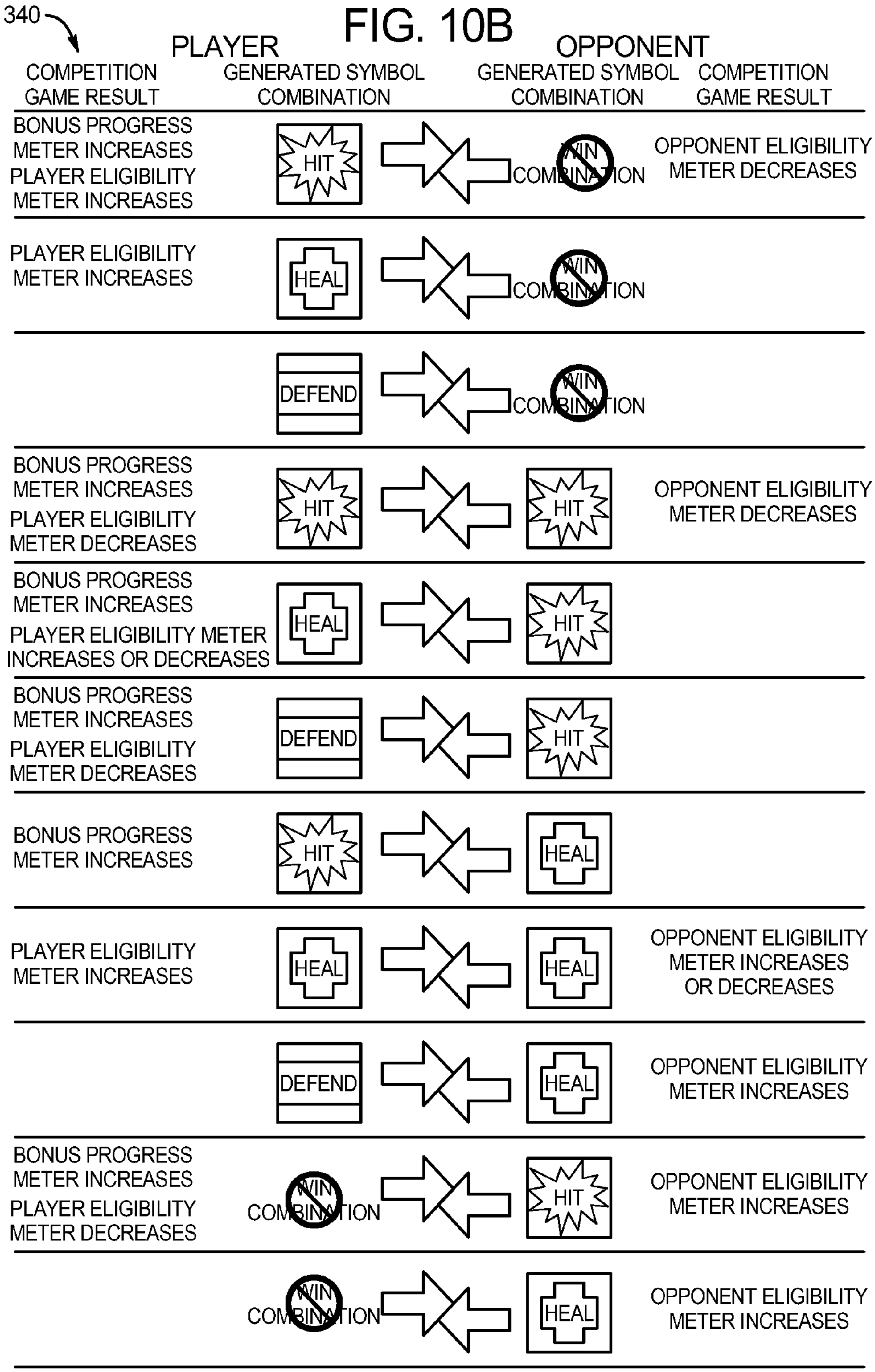

Referring now to FIG. 10B, chart 340 is illustrated which includes a plurality of competition game events in accordance with one embodiment of the disclosed gaming device. Each competition game event is associated with a symbol combination generated from the wagering game. Chart 340 illustrates a plurality of interactions between randomly generated symbol combinations of the player and the opponent for the wagering game and the affect these generated symbol combinations have on the competition game.

In one embodiment, the competition game is associated with one or more paytables which associate a plurality of competition game events with an amount of change for the player eligibility meter (or the opponent eligibility meter). In one such embodiment, a first paytable associates a first competition game event (e.g., a hit event) with a first amount of change for the player eligibility meter (e.g., 5 life units or 5%) and a second, different paytable associates the first competition game event (e.g., the hit event) with a second, different amount of change for the player eligibility meter (e.g., 6 life units or 6%). In one such embodiment, the first paytable and the second paytable have different conversion rates between the life units and the percentages of the player eligibility meter (or the opponent eligibility meter).

In one embodiment, the gaming system determines a ranking hierarchy between the competition game events and determines the results of the competition game based on such ranking hierarchy. For example, an opponent eligibility meter decrease event (e.g., a hit event) ranks higher relative to a player eligibility meter decrease event (e.g., a hit event). The player eligibility meter decrease event (e.g., a hit event) ranks higher relative to a player eligibility meter increase event (e.g., a heal event). The player eligibility meter increase event (e.g., a heal event) is ranked higher relative to a player eligibility meter decrease modifier event (e.g., a defend event). The player eligibility meter decrease modifier event (e.g., a defend event) is ranked higher than a neutral event or non-winning symbol combination.

In one embodiment, as illustrated by chart 340 of FIG. 10B, if a non-winning symbol combination results from the generated symbol combination for the opponent and a hit event (e.g., an opponent eligibility meter decrease event) results from the generated symbol combination for the player, the gaming system decreases the opponent eligibility meter. As further illustrated by chart 340, if a non-winning symbol combination results from the generated symbol combination for the opponent and a heal event (e.g., a player eligibility meter increase event) results from the generated symbol combination for the player, the gaming system increases the player eligibility meter.

In one embodiment, the gaming system independently and individually determines: (i) a wagering game outcome (e.g., an award) based on each generated symbol combination for the player (or for the opponent) in the wagering game, and (ii) a competition game outcome (e.g., an animated sequence such as a hit event, heal event or defend event) based on each generated symbol combination for the player (or for the opponent) in the wagering game. In another embodiment, the gaming system determines a net result of the symbol combination randomly generated for the player in the wagering game and the symbol combination randomly generated for the opponent in the wagering game. For example, if the symbol combination randomly generated for the player in the wagering game decreases the opponent eligibility meter by seven percent and if the symbol combination randomly generated for the opponent in the wagering game decreases the player eligibility meter by twelve percent, the gaming system causes the player eligibility meter to decrease by five percent (e.g., twelve percent minus seven percent).

As indicated by block 260, if the generated symbol combination corresponds to a player eligibility meter decrease modifier event (e.g., a defend event), the gaming device generates a symbol combination for the opponent as indicated by block 278.

As indicated by block 262, if the generated symbol combination corresponds to a player eligibility meter increase event (e.g., a heal event), the gaming device causes an award to be provided to the player based on the generated symbol combination, as indicated by block 264. After causing the award to be provided, the gaming device generates a symbol combination for the opponent as indicated by block 278.

As indicated by block 266, if the generated symbol combination corresponds to an opponent eligibility meter decrease event (e.g., a hit event), the gaming device causes an award to be provided to the player based on the generated symbol combination, as indicated by block 265. After causing the award to be provided, the gaming device determines whether the player defeated the opponent as indicated by block 268. If the player has defeated the opponent, the gaming device provides a bonus award to the player. In one embodiment, the bonus award including a bonus game, a credit award, a progressive award, an upgrade for the competition game or any other suitable award.

After providing the player the bonus award, the gaming device prompts the player to continue the competition game, as indicated by block 272. If the player does not want to continue, the gaming device enables the player to cash out and ends the competition game, as indicated by block 274. If the player chooses to continue the competition game, the gaming device enables the player to compete against another opponent. As indicated by block 276, the gaming device selects a new opponent for the player to compete against in a subsequent round of the competition game.

Referring back to block 268 in FIG. 7 and FIG. 10A, if the player did not defeat the opponent, the gaming device generates a symbol combination for the opponent, as indicated by block 278. Chart 330 illustrated in FIG. 10A includes a plurality of competition game events in accordance with one embodiment of the disclosed gaming device. Each competition game event is associated with a range of values (e.g., percentages or life units), which represent an amount of change for the player eligibility meter and/or the opponent eligibility meter. Referencing chart 330, if a neutral event results from the symbol combination randomly generated for the opponent in the wagering game, the player eligibility meter reflects no change. As indicated by chart 330 of FIG. 10A and block 280 of FIG. 7, if a player eligibility meter decrease event (e.g., a hit event) results from the symbol combination randomly generated for the opponent in the wagering game, the player eligibility meter reflects a change between 1% and 100%. That is, the player eligibility meter decreases by 1% (e.g., at a minimum hit value) to 100% (e.g., at a maximum hit value). As described above, in one embodiment, the gaming device converts each percentage of the player eligibility meter into a number of life units. Based on a conversion rate of one life unit per one percent of the player eligibility meter, the player eligibility meter decreases between 1 life unit and 100 life units.

After decreasing the player eligibility meter, the gaming device determines whether the opponent defeated the player, as indicated by block 284. If the opponent did not defeat the player (i.e., the player eligibility meter is not zero), the gaming device prompts the player to continue the competition game, as indicated by block 272. If the player does not want to continue, the gaming device enables the player to cash out and ends the competition game, as indicated by block 274. If the player chooses to continue the competition game, the process 250 continues to block 254 without selecting a new opponent as indicated by block 276.

As indicated by block 282, if an opponent eligibility meter increase event (e.g., a heal event) results from the symbol combination randomly generated for the player in the wagering game, the opponent eligibility meter increases between 10% and 100%.

As indicated by block 286, the gaming device increases the bonus triggering event progress meter based on the generated symbol combinations as indicated by block 258 for the player and by block 278 for the opponent. In one embodiment, any decrease to the player eligibility meter resulting from the generated symbol combinations as indicated by block 258 for the player and by block 278 for the opponent will increase the bonus triggering event progress meter. After increasing the bonus triggering event progress meter, the gaming device determines whether the bonus triggering event progress meter is full as indicated by block 288. If the bonus triggering event progress meter is not full, the gaming device determines whether the opponent defeated the player, as indicated by block 284.

If the bonus triggering event progress meter is full (i.e., reached a designated value), as indicated by block 290, the bonus triggering event occurs, and the gaming device triggers a bonus event. In one embodiment, the bonus event generates a bonus symbol combination for the player with at least one additional symbol generator, at least one additional symbol and/or at least one additional paylines. In one embodiment, the gaming device enables the player to selectively activate the bonus triggering event so that the player can selectively utilize the bonus event at the player's discretion. In one embodiment, if the player defeats the opponent with the bonus symbol combination, the gaming device enables the player to refill the bonus triggering event progress meter as a result of the generated bonus symbol combination (i.e., to re-trigger the bonus event).

In one embodiment, the gaming system individually determines each of the competition game events and individually displays the results of such competition game events (e.g., as such events occur). For example, if the player obtains an opponent eligibility meter decrease event (e.g., a hit event) that is associated with a designated amount of life points (e.g., 5 life points or 5%), the gaming system displays the hit event (e.g., through an animated event or sequence) and the opponent eligibility meter decreases by the designated amount associated with that hit event (e.g., 5 life units or 5%). In this embodiment, this ends the player's turn. If the opponent eligibility meter equals zero, the opponent forfeits his turn. If the opponent eligibility meter is greater than zero, the opponent takes his turn. For the opponent's turn, if the opponent obtains a player eligibility meter decrease event (e.g., a hit event) that is associated with a designated amount of life points (e.g., 10 life points or 10%), the gaming system displays the hit event (e.g., through an animated event or sequence) and the player eligibility meter decreases by the designated amount (e.g., 10 life units or 10%).

In one embodiment, the gaming system processes the randomly generated symbol or symbol combination for the player independent of the randomly generated symbol or symbol combination for the opponent. As described above, if the gaming system randomly generates the first symbol combination in the wagering game for the player and randomly generates the second symbol combination in the wagering game for the opponent, the gaming system displays the first game event for the player and the second game event for the opponent. In this embodiment, the gaming system displays the first game event which decreases the opponent eligibility meter and subsequently displays the second game event which decreases the player eligibility meter. That is, the gaming system independently processes the game events for the player and the opponent which result from the randomly generated symbol combinations from the wagering game.

In another embodiment, the gaming system processes the randomly generated symbol or symbol combination for the player together with the randomly generated symbol or symbol combination for the opponent. That is, if the gaming system randomly generates the first symbol combination in the wagering game for the player and randomly generates the second symbol combination in the wagering game for the opponent, the gaming system compares the randomly generated first symbol combination with the randomly generated second symbol combination to determine the game event for the player and/or the game event for the opponent in the competition game. For example, in this embodiment, the gaming system displays the first game event which decreases the opponent eligibility meter and subsequently displays the second game event which decreases the player eligibility meter. That is, the gaming system independently processes the game events for the player and the opponent which result from the randomly generated symbol combinations from the wagering game.

In one embodiment, the gaming system sequentially displays: (i) at least one game event associated with the randomly generated symbol combination for the player, and (ii) at least one game event associated with the randomly generated symbol combination for the opponent. That is, the gaming system displays the competition game event resulting from the player's turn before displaying the competition game event resulting from the opponent's turn, or vice versa.

Figure 11:
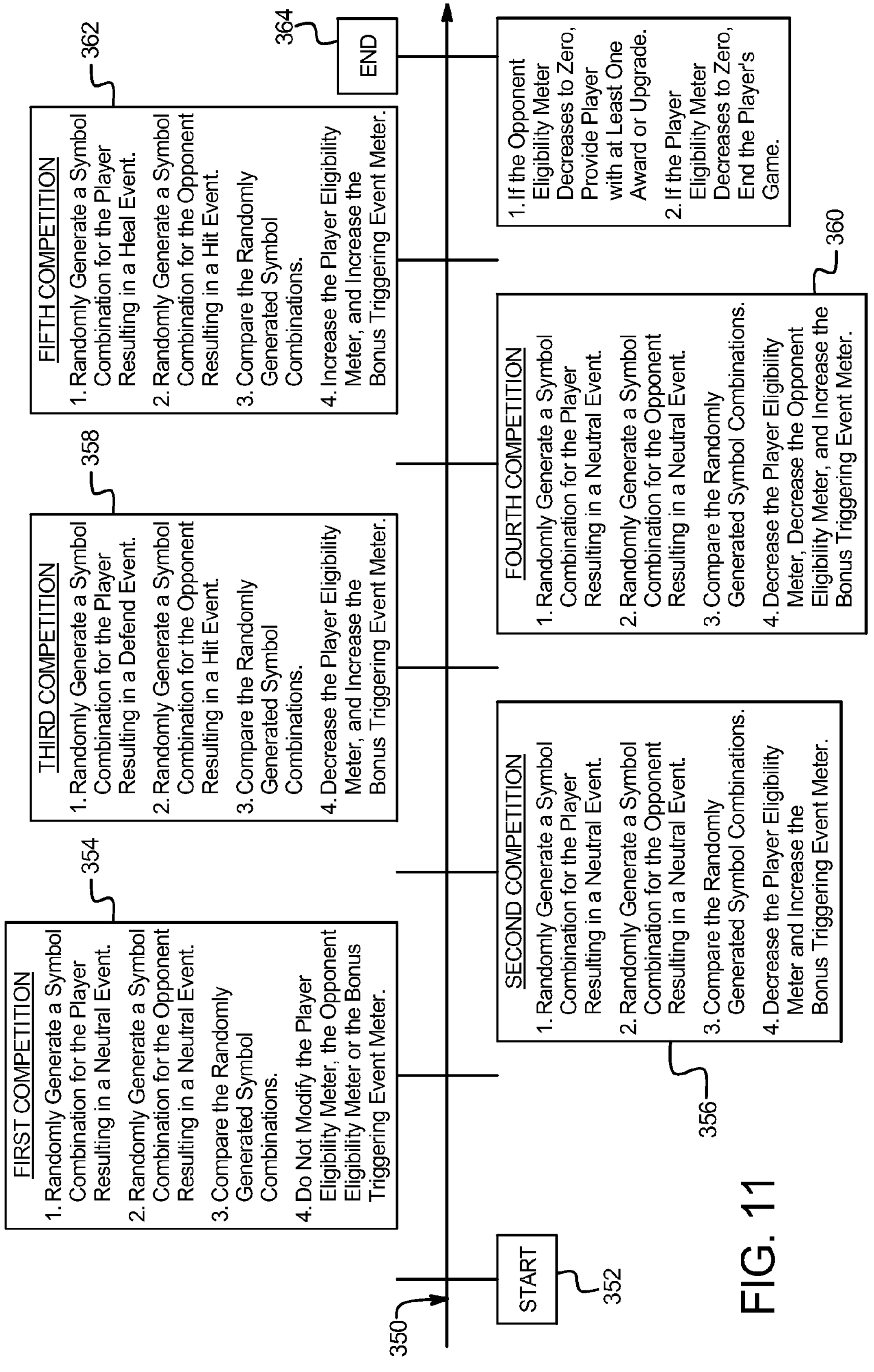
FIG. 11 is a timeline showing one round of a competition game and a plurality of plays of a wagering game being sequentially played by a player at one of the gaming devices in accordance with one embodiment of the disclosed gaming system.

Referring now to FIGS. 11 and 12A to 12E, one round of the competition game is described in accordance with one embodiment of the disclosed gaming system. FIG. 11 illustrates a timeline 350 showing a plurality of events which occur during the competition game in accordance with one embodiment of the disclosed gaming system. FIGS. 12A to 12E illustrate front plan views of one gaming device in accordance with the plurality of events of timeline 350 of FIG. 11. As seen in FIGS. 12A to 12E, the display device 16 or 18 displays an informational area 230 and a message area 232 to indicate the results of the wagering game and/or the competition game to the player for illustrative and informational purposes. In one embodiment, the display device 16 or 18 does not display the informational area 230 and/or the message area 232 to the player.

Figure 12A:
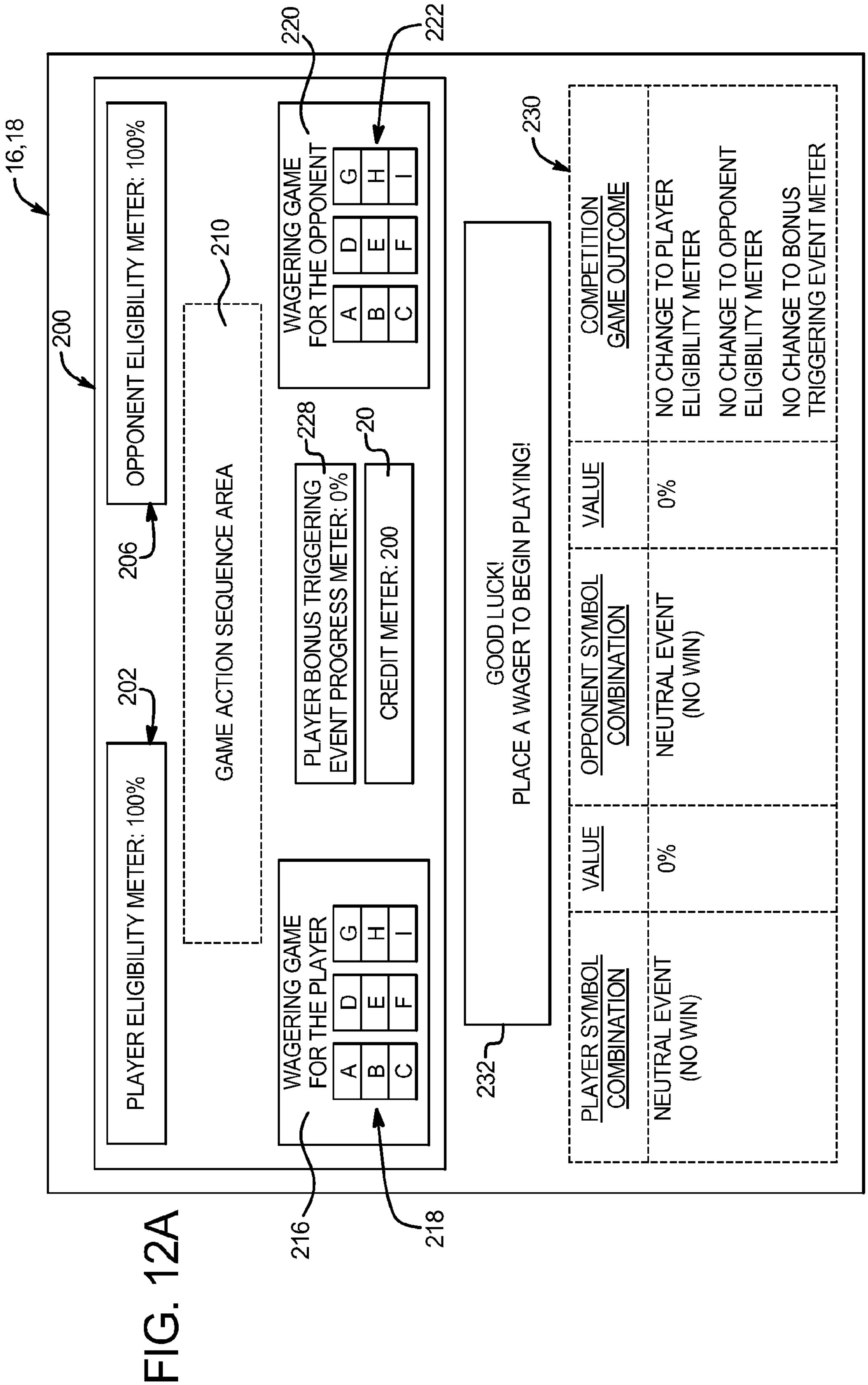
FIGS. 12A, 12B, 12C, 12D and 12E are front plan views of one gaming device in accordance with one embodiment of the disclosed gaming system.

Timeline 350 indicates that the competition game starts at an initial point of time 352. At this point in time, as illustrated in FIG. 12A, the player eligibility meter 202 and the opponent eligibility meter indicate one-hundred percent. The player bonus triggering event progress meter indicates zero percent. The credit meter 20 indicates that the player has two-hundred credits.

In one embodiment, the competition game starts after the player places a wager, such as a side-wager or a wager of a designated minimum amount. In another embodiment, the competition game starts concurrently with a wagering game, wherein the gaming device enables the player to place a wager for each play of the wagering game. In one embodiment, the competition game is funded from a paytable associated with a primary or base game. In another embodiment, the competition game starts as a bonus game after a designated triggering event. In one embodiment, the designated triggering event may be a selected outcome in a primary game or a particular arrangement of one or more indicia on a display device in the primary game, such as the number seven appearing on three adjacent reels along a payline in the primary game embodiment seen in FIGS. 1A and 1B. In other embodiments, the designated triggering event occurs based on exceeding a certain amount of game play (such as number of games, number of credits, amount of time), or reaching a specified number of points earned during game play.

In one embodiment, the gaming system determines which players can participate in the competition game. In one such embodiment, the central controller of the gaming system tracks all active gaming devices and the wagers placed at those gaming devices. Each gaming device defines its state as either active or inactive and also defines the wagers or wager amounts placed at that gaming device. In one embodiment, active status means that the gaming device is being actively played by a player and enrolled/inactive status means that the gaming device is not being actively played by a player. The active status requirements can be based on any suitable number of satisfied criteria or defined in any suitable manner by the implementer of the gaming system. In one such embodiment, upon the occurrences of the designated triggering event, the gaming system causes the wagering game and/or the competition game to be displayed at the active gaming devices.

At a second point in time 354 along timeline 350 of FIG. 11, the gaming device displays a first competition between the player and the opponent. For the first competition, the gaming device randomly generates at least one symbol combination for the player in the wagering game and randomly generates at least one symbol combination for the opponent in the wagering game. It should be appreciated that the player can wager on one or more paylines and that the gaming device evaluates the symbol combination indicated by each payline wagered on by the player in the wagering game. For example, if the player wagers on nine paylines, the gaming system randomly generates a plurality of symbol combinations for the player in the wagering game and evaluates each symbol combination (e.g., nine symbol combinations) indicated by each payline wagered on by the player.

In one embodiment, the gaming device evaluates the same number of symbol combinations for the player and for the opponent. For example, if the player wagers on three paylines, the gaming system evaluates three symbol combinations for the player and three symbol combinations for the opponent in the wagering game. In another embodiment, the gaming system evaluates different numbers of symbol combinations for the player and for the opponent to adjust the difficulty of the competition game. In one such embodiment, to provide the player with an advantage over the opponent (e.g., to decrease the round difficulty for that opponent), the gaming system evaluates three symbol combinations for the player and one symbol combination for the opponent.

In one embodiment, the symbol evaluation for the wagering game occurs for each wagered on payline. For example, if the player wagers on three paylines, the gaming system evaluates three separate symbol combinations to generate an outcome for each competition. In one embodiment, the gaming system causes the game action sequence area 210 to display the graphical representation of the player (or opponent) performing the game action associated with each randomly generated symbol combination indicated by each payline wagered on by the player. In the above example, if the player wagered on three paylines and obtained symbol combinations associated with a first hit event, a heal event and a second hit event for the competition game, the gaming system causes the game action sequence area 210 to display the graphical representation of the player performing these game actions before the opponent's turn. In another embodiment, the gaming system causes the game action sequence area 210 to display the graphical representation of the player performing a first one of the game actions associated with one of the randomly generated symbol combinations (e.g., a player's turn) and the graphical representation of the opponent performing a first one of the game actions associated with one of the randomly generated symbol combinations (e.g., the opponent's turn) before displaying the graphical representations of the player and opponent performing a second one of the game actions.

For illustrative purposes, the embodiment illustrated in FIGS. 12A to 12E shows the player wagering on one payline (e.g., the middle payline). For the wagered on payline, the gaming system randomly generates a symbol combination for the player in the wagering game and evaluates the symbol combination indicated by the payline wagered on by the player. The gaming system also randomly generates a plurality of symbol combinations for the opponent in the wagering game and evaluates one of the symbol combinations (e.g., the symbol combination indicated by the middle payline).

As illustrated in FIG. 12A, the gaming device generated a symbol combination 218. The generated symbol combination 218 results in a non winning combination for the wagering game 216 and corresponds to a neutral event for the competition game 200. Based on the generated symbol combination 218, the gaming device displays no change to the player eligibility meter 202 or the bonus triggering event progress meter 228. The display device displays an event, action or sequence corresponding to the neutral event in the game action sequence area 210. For example, the game action sequence area 210 displays the graphical representation of the player attempting to strike the graphical representation of the opponent, but missing. This ends the player's turn for the competition game.

In the first competition, the gaming device also generated a symbol combination 222. The generated symbol combination 222 results in a non-winning combination for the opponent and corresponds to a neutral event for the competition game 200. Based on the generated symbol combination 222, the gaming device displays no change to the opponent eligibility meter 206 or the bonus triggering event progress meter 228. This ends the opponent's turn for the competition game 200. In the embodiment illustrated in FIG. 12A, the message area 232 displays an audio, a visual or an audio/visual message indicating a message or instructions to the player. An example of such message or instruction includes any suitable message or instruction, such as "GOOD LUCK!" or "PLACE A WAGER TO BEGIN PLAYING!"

Figure 12B:
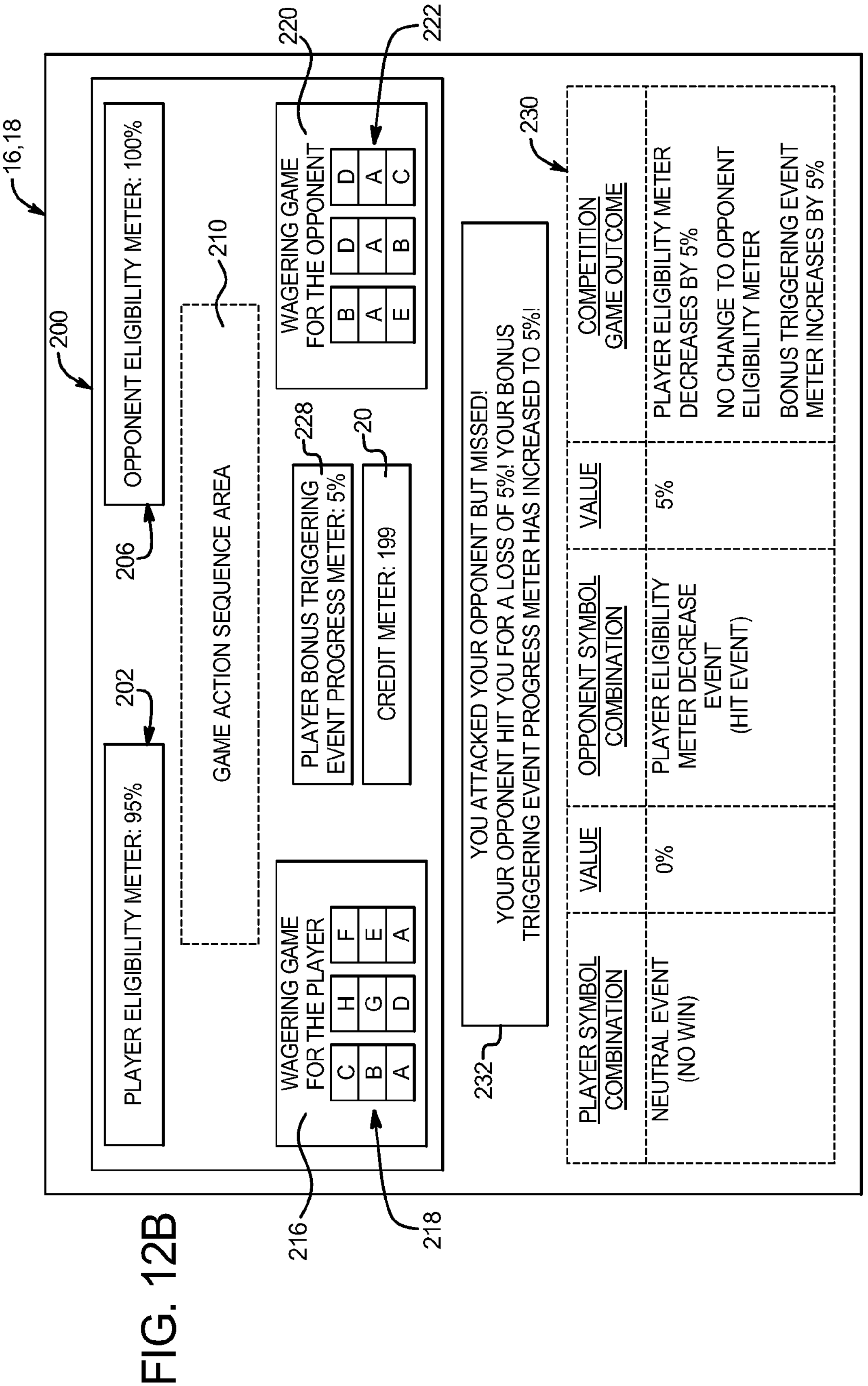

At a third point in time 356 along timeline 350 of FIG. 11, the gaming device displays a second competition between the player and the opponent. For the second competition, the gaming device randomly generates a symbol combination for the player in the wagering game and randomly generates a symbol combination for the opponent in the wagering game. As illustrated in FIG. 12B, the player wagered one credit (e.g., one credit for one payline) for the second competition. The credit meter 20 indicates that the player has one-hundred-ninety-nine credits. In the second competition, the gaming device generated a symbol combination 218. The generated symbol combination 218 results in a non-winning combination for the wagering game 216 and corresponds to a neutral event for the competition game 200. Based on the generated symbol combination 218, the gaming device displays no change to either the player eligibility meter 202 or the opponent eligibility meter 206. The display device displays an event, action or sequence corresponding to the neutral event in the game action sequence area 210. This ends the player's turn for the competition game 200.

In the second competition, the gaming device also generated a symbol combination 222. The generated symbol combination 222 results in a designated symbol combination (e.g., A-A-A) for the opponent and corresponds to a player eligibility meter decrease event (e.g., a hit event) for the competition game 200. Based on the generated symbol combination 222, the gaming device displays the player eligibility meter 202 decreased by five percent. The display device displays an event, action or sequence corresponding to the player eligibility meter decrease event (e.g., a hit event) in the game action sequence area 210. This ends the opponent's turn for the competition game 200. The player eligibility meter indicates ninety-five percent after being decreased during the opponents turn by the opponent's player eligibility meter decrease event. The opponent eligibility meter indicates one-hundred percent and did not change. The player bonus triggering event progress meter 228 increased to five percent based on the player eligibility meter 202 decreasing by five percent. In this embodiment, the player bonus triggering event progress meter 228 changes relative to any decreases to the player eligibility meter 202. In the embodiment illustrated in FIG. 123, the message area 232 displays an audio, a visual or an audio/visual message indicating a message or instructions to the player. An example of such message or instruction includes any suitable message or instruction, such as "YOU ATTACKED YOUR OPPONENT BUT MISSED! YOUR OPPONENT HIT YOU FOR A LOSS OF 5%. YOUR BONUS TRIGGERING EVENT PROGRESS METER HAS INCREASED TO 5%!"

Figure 12C:
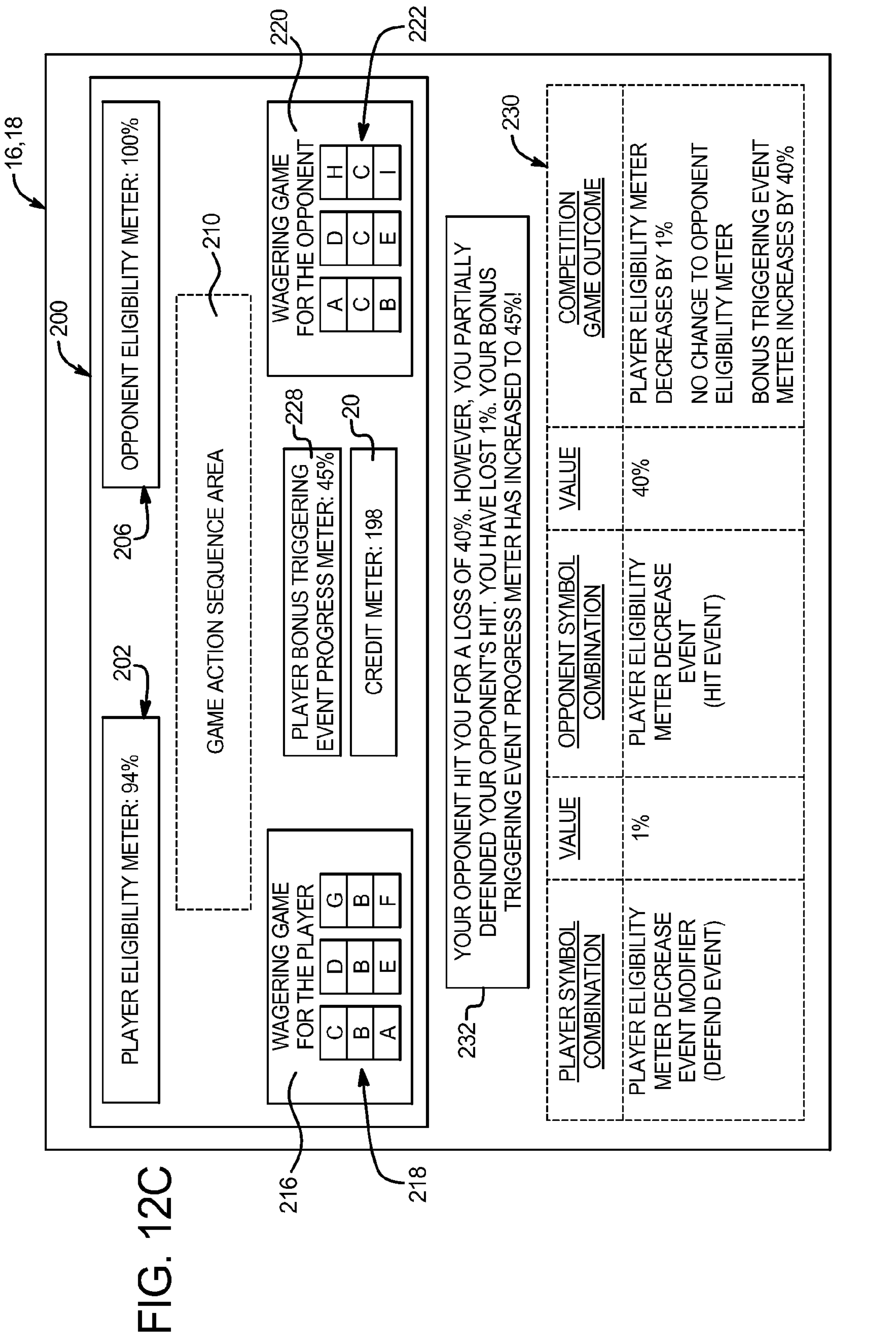

At a fourth point in time 358 along timeline 350 of FIG. 11, the gaming device displays a third competition between the player and the opponent. For the third competition, the gaming device randomly generates a symbol combination for the player in the wagering game and randomly generates a symbol combination for the opponent in the wagering game. As illustrated in FIG. 12C, the player wagered one credit (e.g., one credit for one payline) for the third competition. The credit meter 20 indicates that the player has one-hundred-ninety-eight credits. For the third competition, the gaming device generated a symbol combination 218. The symbol combination 218 results in a designated symbol combination (e.g., B-B-B) for the wagering game 216 and corresponds to a player eligibility meter decrease modifier event (e.g., a defend event) for the competition game 200. In one embodiment, the gaming device causes an award to be provided to the player for the player eligibility meter decrease modifier event (e.g., a defend event). Based on the generated symbol combination 218, the gaming device displays no change to either the player eligibility meter 202 or the opponent eligibility meter 206. The display device displays an event, action or sequence corresponding to the player eligibility meter decrease modifier event (e.g., a defend event) in the game action sequence area 210. In one embodiment, since the player's turn is before the opponent's turn, the gaming device treats the player eligibility meter decrease modifier event (e.g., a defend event) as a neutral event because the opponent has yet to take a turn. In another embodiment, the gaming device enables the player to use the player eligibility meter decrease modifier event (e.g., a defend event) to lessen the effect of the opponent's next turn. This ends the player's turn for the competition game 200.

In the third competition, the gaming device also generated a symbol combination 222. The generated symbol combination 222 results in a designated symbol combination (e.g., C-C-C) for the opponent and corresponds to a player eligibility meter decrease event (e.g., a hit event) for the competition game 200. Based on a comparison of the generated symbol combination 218 and the generated symbol combination 222, the player eligibility meter 202 decreases by one percent. As illustrated in FIG. 12C, the player eligibility meter decrease modifier event (e.g., a defend event) lessens the effect of the player eligibility meter decrease event (e.g., a hit event) has on the player eligibility meter 202. In this instance, the player eligibility meter decrease modifier event (e.g., a defend event) trumps the player eligibility meter decrease event (e.g., a hit event) and the player eligibility meter 202 decreases by one percent instead of forty-five percent. The display device displays an event, action or sequence corresponding to the player eligibility meter decrease modifier event (e.g., a defend event) and the player eligibility meter decrease event (e.g., a hit event) player eligibility meter decrease event (e.g., a hit event) in the game action sequence area 210. For example, the game action sequence area 210 displays the graphical representation of the opponent striking the graphical representation of the player while attempting to block or shield the strike. This ends the opponent's turn for the competition game 200. The player eligibility meter indicates ninety-four percent after being decreased during the opponent's turn by the opponent's player eligibility meter decrease event (with lessened effect). The opponent eligibility meter indicates one-hundred percent and did not change. The player bonus triggering event progress meter 228 increased from five percent to forty-five percent. As illustrated, the bonus triggering event progress meter 228 increased by forty percent due to the amount of the player eligibility meter decrease event (e.g., a hit event) obtained during the opponent's turn for the competition game 200. In the embodiment illustrated in FIG. 12C, the message area 232 displays an audio, a visual or an audio/visual message indicating a message or instructions to the player. An example of such message or instruction includes any suitable message or instruction, such as "YOUR OPPONENT HIT YOU FOR A LOSS OF 40%. HOWEVER, YOU PARTIALLY DEFENDED YOUR OPPONENT'S HIT! YOUR HAVE LOST 1%. YOUR BONUS TRIGGERING EVENT PROGRESS METER HAS INCREASED TO 45%!"

Figure 12D:
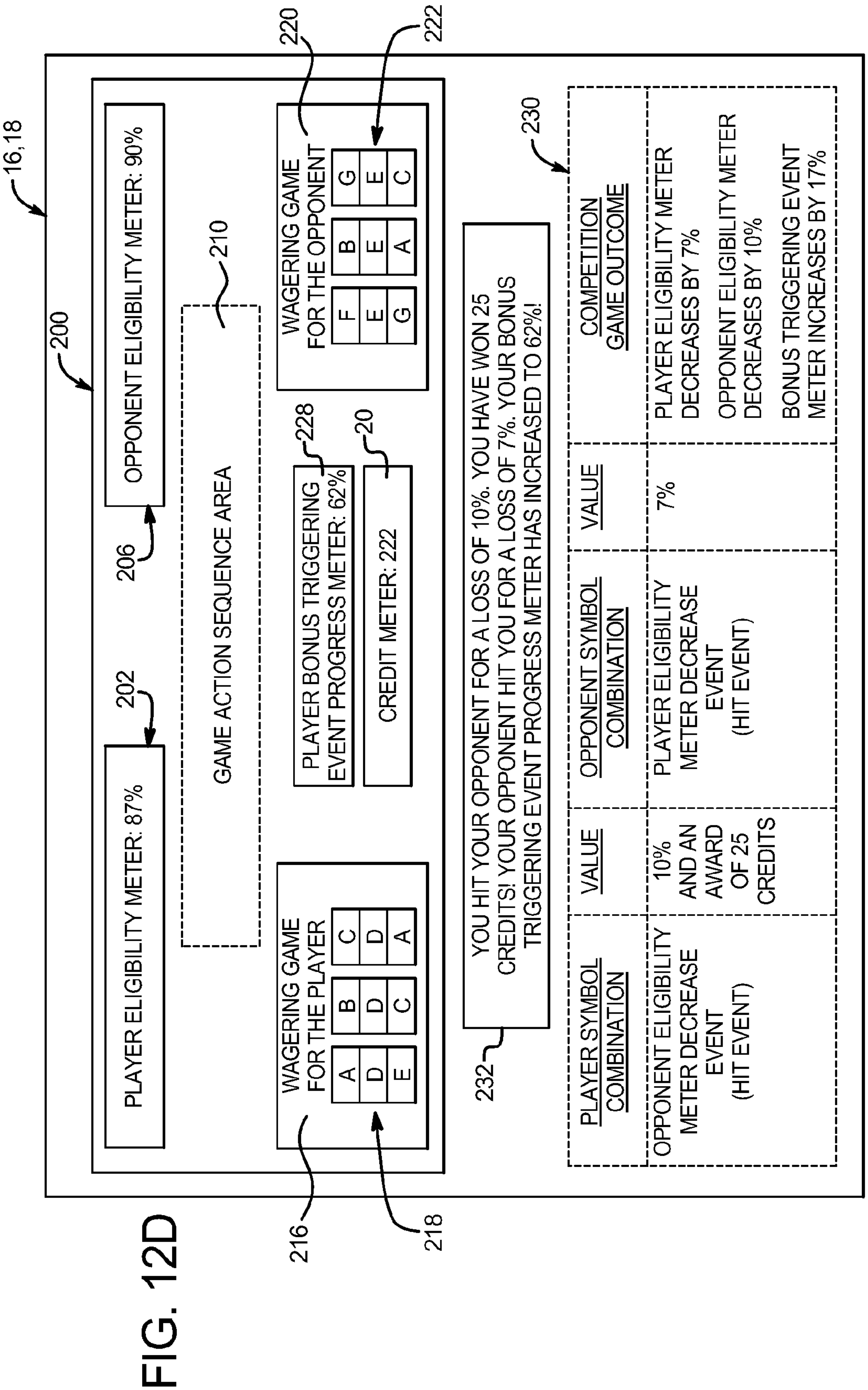

At a fifth point in time 360 along timeline 350 of FIG. 11, the gaming device displays a fourth competition between the player and the opponent. For the fourth competition, the gaming device randomly generates a symbol combination for the player in the wagering game and randomly generates a symbol combination for the opponent in the wagering game. As illustrated in FIG. 12D, the player wagered one credit (e.g., one credit for one payline) for the fourth competition. The credit meter 20 indicates that the player has two-hundred-twenty-two credits (e.g., one-hundred-ninety-eight credits minus one credit and plus twenty-five credits). In the fourth competition, the gaming device generated a symbol combination 218. The symbol combination 218 results in a designated symbol combination (e.g., D-D-D) for the wagering game 216 and corresponds to an opponent eligibility meter decrease event (e.g., a hit event) for the competition game 200. As illustrated, the gaming device causes an award of twenty-five credits to be provided to the player for the opponent eligibility meter decrease event (e.g., a hit event). Based on the generated symbol combination 218, the gaming device displays the opponent eligibility meter 206 decreased by ten percent to ninety percent. The display device displays an event, action or sequence corresponding to the opponent eligibility meter decrease event (e.g., a hit event) in the game action sequence area 210. For example, the game action sequence area 210 displays the graphical representation of the player striking the graphical representation of the opponent. This ends the player's turn for the competition game 200.

In the fourth competition, the gaming device also generated a symbol combination 222. The generated symbol combination 222 results in a designated symbol combination (e.g., EE-E) for the opponent and corresponds to a player eligibility meter decrease event (e.g., a hit event) for the competition game 200. Based on the generated symbol combination 222, the gaming device decreases the player eligibility meter 202 by seven percent. The display device displays an event, action or sequence corresponding to the player eligibility meter decrease event (e.g., a hit event) in the game action sequence area 210. For example, the game action sequence area 210 displays the graphical representation of the opponent striking the graphical representation of the player. This ends the opponent's turn for the competition game 200. The gaming device decreased the player eligibility meter by seven percent to eighty-seven percent and decreased the opponent eligibility meter by ten percent to ninety percent.

The gaming device increased the player bonus triggering event progress meter 228 by seventeen percent to sixty-two percent. As illustrated, the bonus triggering event progress meter 228 increased by seventeen percent by summing the amounts (e.g., numerical values) of the opponent eligibility meter decrease event (e.g., a hit event) obtained during the player's turn for the competition game 200 and the player eligibility meter decrease event (e.g., a hit event) obtained during the opponent's turn for the competition game 200. In the embodiment illustrated in FIG. 12D, the message area 232 displays an audio, a visual or an audio/visual message indicating a message or instructions to the player. An example of such message or instruction includes any suitable message or instruction, such as "YOU HIT YOUR OPPONENT FOR A LOSS OF 10%. YOU HAVE WON 25 CREDITS! YOUR OPPONENT HIT YOU FOR A LOSS OF 7%. YOUR BONUS TRIGGERING EVENT PROGRESS METER HAS INCREASED TO 62%!"

Figure 12E:
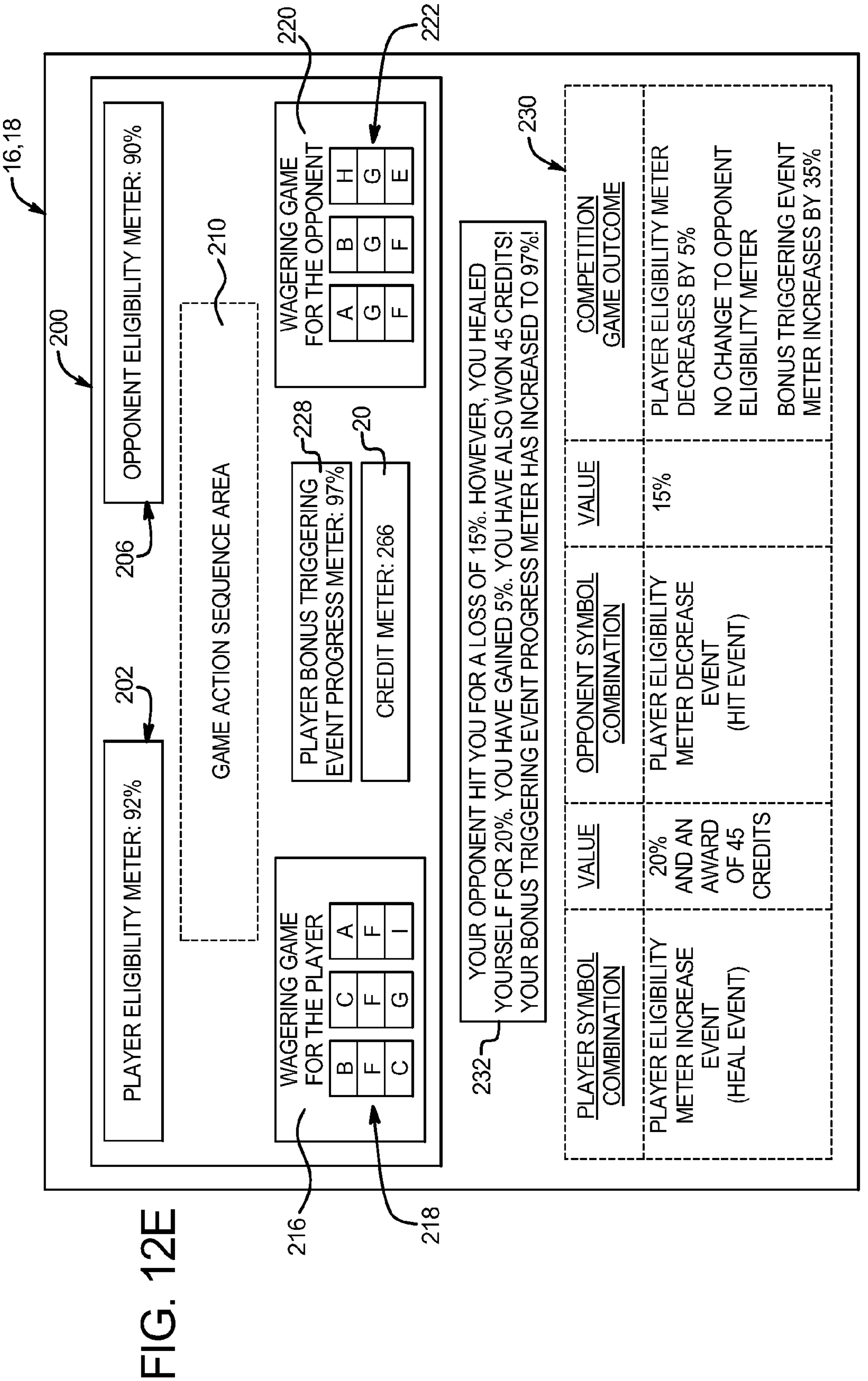

At a sixth point in time 362 along timeline 350 of FIG. 11, the gaming device displays a fifth competition between the player and the opponent. For the fifth competition, the gaming device randomly generates a symbol combination for the player in the wagering game and randomly generates a symbol combination for the opponent in the wagering game. As illustrated in FIG. 12E, the player wagered one credit (e.g., one credit for one payline) for the fifth competition. The credit meter 20 indicates that the player has two-hundred-sixty-six credits (e.g., two-hundred-twenty-two credits minus one credit and plus forty-five credits). For the fifth competition, the gaming device generated a symbol combination 218. The symbol combination 218 results in a designated symbol combination (e.g., F-F-F) for the wagering game 216 and corresponds to a player eligibility meter increase event (e.g., a heal event) for the competition game 200. As illustrated, the gaming device causes an award of forty-one credits to be provided to the player for the player eligibility meter increase event (e.g., a heal event). Based on the generated symbol combination 218, the gaming device displays the opponent eligibility meter 206 decreased by ten percent to ninety percent. The display device displays an event, action or sequence corresponding to the player eligibility meter increase event (e.g., a heal event) in the game action sequence area 210. For example, the game action sequence area 210 displays the graphical representation of the player drinking portion to restore a portion or all of the player eligibility meter. This ends the player's turn for the competition game 200.

In one embodiment, the gaming device limits any restoration of health or eligibility to one-hundred percent. For example, if the player eligibility meter indicates ninety percent and the player obtains a heal event that increases the player eligibility by fifteen percent, the gaming device limits or caps the player eligibility meter at one-hundred percent. In another embodiment, the gaming device accounts for any restoration of health or eligibility exceeding one-hundred percent by saving or banking such health or eligibility for a subsequent competition game and/or a competition game event. For example, if the player eligibility meter indicates ninety percent and the player obtains a heal event that increases the player eligibility by fifteen percent, the gaming device displays the player eligibility meter at one-hundred percent while banking or saving the remaining five percent. In this example, the gaming device and/or the gaming system treats the player eligibility meter as being equal to one-hundred-five percent for the competition game though the gaming device only displays the player eligibility meter at one-hundred percent.

For the fifth competition, the gaming device also generated a symbol combination 222. The generated symbol combination 222 results in a designated symbol combination (e.g., G-G-G) for the opponent and corresponds to a player eligibility meter decrease event (e.g., a hit event) for the competition game 200. Based on the generated symbol combination 222, the player eligibility meter 202 decreases by fifteen percent. The display device displays an event, action or sequence corresponding to the player eligibility meter decrease event (e.g., a hit event) in the game action sequence area 210. For example, the game action sequence area 210 displays the graphical representation of the opponent striking the graphical representation of the player. This ends the opponent's turn for the competition game 200. The player eligibility meter increased by five percent to ninety-two percent and the opponent eligibility meter remains at ninety percent. The player bonus triggering event progress meter 228 increased by thirty-five percent to ninety-seven percent.

As illustrated in the embodiment of FIG. 12E, the bonus triggering event progress meter 228 increased by thirty-five percent by summing the amounts (e.g., numerical values) of the player eligibility meter increase event (e.g., a heal event) obtained during the player's turn for the competition game 200 and the player eligibility meter decrease event (e.g., a hit event) obtained during the opponent's turn for the competition game 200. The message area 232 displays an audio, a visual or an audio/visual message indicating a message or instructions to the player. An example of such message or instruction includes any suitable message or instruction, such as "YOUR OPPONENT HIT YOU FOR A LOSS OF 15%. HOWEVER, YOU HEALED YOURSELF FOR 20%. YOU HAVE GAINED 5%. YOU HAVE ALSO WON 45 CREDITS! YOUR BONUS TRIGGERING EVENT PROGRESS METER HAS INCREASED TO 97%!"

At a seventh point in time 364 along timeline 350 of FIG. 11, the gaming device ends the round of the competition game 200. As described above, the gaming device ends the round of the competition game 200 if the opponent eligibility meter decreases to zero percent (e.g., zero life units). In this instance, the gaming device causes an award to be provided to the player, such as a bonus award, or an upgrade, such as upgraded competition game feature for a subsequent round. The round of the competition game ends if the player eligibility meter decreases to zero (e.g., zero life units) or if the player chooses to quit the competition game and cash out. In such instances, the gaming device enables the player to start another round of the competition game as illustrated at point in time 352 of FIG. 11.

In one embodiment, if the competition game ends, the gaming system provides the player an opportunity to play another competition game. For example, if the player eligibility meter decreases to zero, the gaming system enables the player to add funds to increase or replenish the player eligibility meter as described above. In one embodiment, if the eligibility meter decreases to zero, the gaming system enables the player to repeat the same competition game (or the same round for the competition game). For example, the gaming system enables the player to continue the same competition game from the same or different point in that competition game. In this example, in the repeated competition game (or the repeated round), the player eligibility meter and/or the opponent eligibility meter are reset to their initial values and the bonus triggering event progress meter resets to zero. In another example, if the player advances to and beats the final round of the competition game, the gaming system enables the player to repeat the same competition game. In another embodiment, when the competition game ends, the gaming system enables the player to play a different competition game, such as a competition game having a different theme, a different number of rounds, a different number of opponents, a different player eligibility meter (e.g., a different number of life units per round), a different paytable or any other suitable characteristic.

In one embodiment, the values of the bonus triggering event progress meter and/or the player eligibility meter carry over from round to round of the competition game until the player eligibility meter reaches zero (or until the bonus triggering event occurs). In another embodiment, the value of the bonus triggering event progress meter carries over from round to round of the competition game until the player eligibility meter reaches zero and the value of the player eligibility meter is reset for each round. In one embodiment, the value of the bonus triggering event progress meter is reset for each round and/or when the player eligibility meter reaches zero.

In one embodiment, the gaming system enables the player to save any progress achieved in the competition game. For example, the gaming system enables the player to save at least one of the following: (i) the round of the competition game, (ii) the status of the player eligibility meter, (iii) the status of the opponent eligibility meter, (iv) the status of the player bonus triggering event progress meter, and (v) the status of the opponent eligibility meter.

In one embodiment, the gaming system enables the player to save the player's progress in association with a player tracking card or smart card. Storing the player's progress in association with a player tracking card or a smart card enables the player to restore the players progress at a different time. Alternatively, in another embodiment, the gaming system saves the player progress to a player account associated with the gaming system and accessible to the player via a personal identification number, biometric identification, or any other suitable identification.

In one embodiment, the gaming system enables each one of the gaming devices to save any progress achieved in the competition game. For example, the gaming system enables each one of the gaming devices to save at least one of the following: (i) the round of the competition game, (ii) the status of the player eligibility meter, (iii) the status of the opponent eligibility meter, (iv) the status of the player bonus triggering event progress meter, and (v) the status of the opponent eligibility meter. In this embodiment, the gaming system enables a gaming device to save the progress achieved by a first player, so that if a second player begins to play at the gaming device, the second player can resume the competition game from the point (or round) where the first player left off. In another embodiment, the gaming system causes the gaming device to display a countdown timer which limits the second player to a designated period of time in which to resume the competition game from the point (or round) where the first player left off.

In one embodiment, the gaming system enables the player to play the competition game for a fee or buy-in. For example, the gaming system displays the competition game after the player pays a fee to the gaming establishment. In this example, the player buys into the competition game. In one embodiment, the fee is predetermined or otherwise determined by the gaming system implementer. In another embodiment, the player must make a separate side-wager on the wagering game (i.e., other than the wager placed for each play of the wagering game) to qualify for the competition game.

In one embodiment, the gaming system enables the player to compete against a different opponent in each round of the competition game. For example, the competition game includes a plurality of rounds, wherein each round is associated with a different virtual or computer-controlled opponent. That is, in this embodiment, the gaming system enables one player to compete against one or more virtual or computer-controlled opponents in the competition game. Each virtual or computer-controlled opponent is associated with at least one different characteristic. Such characteristics include, but are not limited to, the quantity of symbols available for the wagering game, probability data associated with the competition game (e.g., how often a heal event, a defend event and/or a hit event occur), the quantity or amount of life units per competition game event (e.g., a hit event for a first opponent decreases the player eligibility meter by an amount selected from a first range, such as 1 to 10 life units, while a hit event for a second opponent decreases the player eligibility meter by an amount selected from a second range, such as 5 to 25 life units), the quantity of life units associated with the competition game, or any other suitable characteristic. In one embodiment, a first virtual opponent is associated with an opponent eligibility meter having a first designated amount of life units (e.g., 50 life units) while a second, different virtual opponent is associated with an opponent eligibility meter having a second, different designated amount of life units (e.g., 200 life units). Thus, the difficulty level of the competition game changes for different rounds (e.g., increases as the competition game progresses round to round).

In one embodiment, the gaming system enables the player to compete against another player playing at one of the gaming devices in the gaming system. In this embodiment, the gaming system enables two independent players to compete against one another in the competition game. In one embodiment, the gaming establishment or the gaming system operator charges a rake or fee to each of the players to host or conduct the competition game. That is, each player pays a designated fee to participate in the competition game. In this embodiment, the fee includes, but is not limited to, a predetermined amount, a predetermined percentage of one of the player's wagers, a predetermined percentage of both players' wagers, or any amount or percentage deemed suitable by the gaming establishment and/or the gaming system operator.

In one embodiment, the gaming system enables the player to compete against another player playing at one of the gaming devices in the gaming system. In one such embodiment, the gaming system enables two independent players to compete against one another in the competition game, while competing against the house for the individual rounds in the competition game. In one embodiment, the gaming establishment or the gaming system operator charges a fee for each competition within the competition game. That is, the players play against the house for any winnings they might accrue during the competition. In this embodiment, the winner of the competition is awarded a total prize (e.g., the full prize winnings from both players) or a predetermined percentage of any amounts won by the losing players.

In one embodiment, where the competition game is a turn-based game, the gaming system suitably determines which player takes their turn first. In different embodiments, the determination of which player takes their turn first is randomly determined, predetermined, determined based on the player's player tracking status (as determined through a suitable player tracking system), determined based on each player's wager, determined based on each player's player eligibility meter, determined based on time, or determined based on another suitable method. In another embodiment, the gaming system enables both players to take one or more turns simultaneously or substantially simultaneously.

In another embodiment, the gaming system enables a plurality of players to compete against a common opponent as a group or team. In this embodiment, two or more players play against a common opponent. In one such embodiment, the gaming system enables both players to take their turn simultaneously or substantially simultaneously against the common opponent. In one embodiment, the common opponent has increased eligibility to equalize the competition. For example, if a player competes against a designated opponent, the gaming device enables the player to request (i) to join a team competing against the same designated opponent, or (ii) to field requests from players seeking a teammate to compete against the same designated opponent. In one embodiment, one of the gaming devices in the gaming system sends the request to the central controller of the gaming system and the central controller polls other gaming devices in the gaming system to fulfill such requests. If another player at another gaming device in the gaming system wishes to fulfill a request, the central controller facilitates the connection between the gaming devices over a data network as described above.

In one embodiment, the gaming system enables a sponsor, advertiser or third party to pay the fee for one or both of the players to play the competition game in exchange for the opportunity to advertise a product, good or service to one or both of the players during their play of the competition game. That is, one or both of the players play a free or sponsored competition game in exchange for receiving advertisements displayed at the gaming device (e.g., on the display device or a service window). In this embodiment, the sponsor, advertiser or third party pays the fee charged by the gaming establishment and/or the gaming system instead of the player(s).

In one embodiment, the gaming system provides the wagering game and/or the competition game to one or more players for a designated amount of time in exchange for a designated wager. For example, the gaming system enables a player to play a designated minimum number of rounds (e.g., two rounds) in exchange for a designated minimum wager (e.g., $5). In one embodiment, the gaming system provides the player with a designated minimum number of life units (e.g., 100 life units) in exchange for a designated wager (e.g., $5). In another embodiment, the gaming system enables a player to play a designated minimum number of rounds (e.g., two rounds) in exchange for a designated wager (e.g., $5), wherein the gaming system enables the player to start each round with at least a designated minimum number of life units (e.g., 80 life units).

In one embodiment, the gaming system automatically wagers one of a plurality of wager components funded by the player after designated wagering events occur in association with the wagering game and/or the competition game. For example, the gaming system enables the player to fund the competition game with coin-in. The credit meter displays the amount of funds available to the player. The gaming system determines the number of life units or the percentage associated with the player eligibility meter based on the funds available to the player. In one embodiment, during the wagering game, if a designated wagering event occurs (e.g., randomly generating a symbol combination along one of a plurality of paylines), the gaming system automatically wagers one of a plurality of wager components on behalf of the player. In another embodiment, during the competition game, if a designated wagering event occurs (e.g., a hit event, a heal event, a defend event or a neutral event), the gaming system automatically wagers one of a plurality of wager components on behalf of the player. In such embodiments, for each designated wagering event that occurs, the gaming system determines a wagering event outcome. In one embodiment, the wagering event outcome results in an increase to the player eligibility meter and/or the opponent eligibility meter by a designated number of life units (or a percentage), a decrease to the player eligibility meter and/or the opponent eligibility meter by a designated number of life units (or a percentage) or no change to the player eligibility meter and/or the opponent eligibility meter. The gaming system then determines whether to provide the player an award based on the determined wagering event outcome for the wagering game and/or the competition game.

In one embodiment, additional game information for the competition game (which is provided by the gaming device) is downloadable to the gaming device through a data network as described above. Such additional game information includes, but is not limited to, additional opponents to compete against the player, additional upgraded competition game features, additional or different awards, additional or different themes, graphics, sounds, and/or videos (e.g., animations), and additional or different probability data. It should be appreciated that the gaming system enables additional game information for the competition game and/or the wagering game to be downloaded to the gaming device through a data network after the gaming device is in a gaming establishment. Additionally, it should be appreciated that such downloaded game information may change one or more aspects or functions of the competition game and/or the wagering game. For example, downloading additional opponents to at least one of the gaming devices to compete against the player lengthens the competition game from a first designated amount of rounds to a second, different designated amount of rounds. In another example, downloading an additional theme to at least one of the gaming devices changes the game events displayed for the competition game and/or the available symbols or symbol combinations for the wagering game. Such downloadable game information varies the look, function; or appeal of the competition game and/or the wagering game. It should be appreciated that in one embodiment, the gaming system provides such downloadable game information as an award or benefit to the player for winning certain rounds, or winning the final round, of the competition game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of operating a gaming system, said method comprising:

(a) causing at least one display device to display a wagering game, the wagering game configured to operate upon a wager placed by a player, the wagering game associated with a paytable, (b) causing the at least one display device to display a competition game between the player and an opponent, wherein the displaying of the competition game occurs independent of any generated wagering game symbol combination, (c) for the wagering game:

(i) causing at least one processor to execute a plurality of instructions to generate a first wagering game symbol combination for the player, (ii) causing the at least one processor to execute the plurality of instructions to determine a wagering game outcome for the player based on the generated first wagering game symbol combination, and (iii) providing the player any award resulting from the determined wagering game outcome based on the paytable, (d) for the competition game:

(i) causing the at least one display device to display a first competition game action based on the generated first wagering game symbol combination for the player, (ii) causing the at least one processor to execute the plurality of instructions to generate a second wagering game symbol combination for the opponent, and (iii) causing the at least one display device to display a second competition game action based on the generated second wagering game symbol combination for the opponent, (e) causing the at least one processor to execute the plurality of instructions to determine a competition outcome based on the first competition game action and the second competition game action, and (f) providing the player any award resulting from the determined competition outcome.

2. The method of claim 1, which includes causing the at least one display device to display of the first competition game action before the display of the second competition game action.

3. The method of claim 1, wherein the competition game includes a plurality of rounds, a plurality of the rounds being associated with a same opponent for the player.

4. The method of claim 1, wherein the competition game includes a plurality of rounds, each one of the rounds being associated with a different opponent for the player.

5. The method of claim 1, wherein the competition game includes a plurality of rounds, for each of a plurality of the rounds, to:

(i) causing the at least one processor to execute the plurality of instructions to determine a round competition outcome based on a displayed round first competition game action and a displayed round second competition game action, (ii) causing the at least one processor to execute the plurality of instructions to compare a generated round first wagering game symbol combination with a generated round second wagering game symbol combination, (iii) causing the at least one display device to display at least one round competition game action based on the comparison, and (iv) repeating (i) to (iii) until a designated ending condition occurs.

6. The method of claim 5, which includes enabling the player to place an additional wager when the designated ending condition occurs to continue the competition game.

7. The method of claim 1, wherein the competition game includes a plurality of rounds and if the player is successful in a first one of the rounds of the competition game, the method includes causing the at least one processor to execute the plurality of instructions to utilize an enhanced feature for a second one of the rounds of the competition game.

8. The method of claim 1, which includes enabling the player to save any progress for the competition game.

9. The method of claim 1, which is provided through a data network.

10. The method of claim 9, wherein the data network is the internet.

* * * * *